(12) United States Patent
Wang et al.

(10) Patent No.: US 11,206,651 B2
(45) Date of Patent: Dec. 21, 2021

(54) METHOD FOR DETECTING AND RECEIVING DOWNLINK CONTROL CHANNEL, USER EQUIPMENT AND NETWORK SIDE DEVICE

(71) Applicant: CHINA ACADEMY OF TELECOMMUNICATIONS TECHNOLOGY, Beijing (CN)

(72) Inventors: Lei Wang, Rochester Hills, MI (US); Tony Ekpenyong, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 8 days.

(21) Appl. No.: 16/608,937

(22) PCT Filed: Apr. 24, 2018

(86) PCT No.: PCT/CN2018/084265
§ 371 (c)(1),
(2) Date: Oct. 28, 2019

(87) PCT Pub. No.: WO2018/196746
PCT Pub. Date: Nov. 1, 2018

(65) Prior Publication Data
US 2020/0196282 A1  Jun. 18, 2020

(30) Foreign Application Priority Data
Apr. 28, 2017  (CN) .......................... 201710307053.1

(51) Int. Cl.
*H04L 5/00* (2006.01)
*H04W 72/04* (2009.01)
(Continued)

(52) U.S. Cl.
CPC .......... *H04W 72/042* (2013.01); *H04W 4/06* (2013.01); *H04W 72/1289* (2013.01)

(58) Field of Classification Search
None
See application file for complete search history.

(56) References Cited

U.S. PATENT DOCUMENTS

2012/0113941 A1* 5/2012 Chung ................ H04L 27/2602
370/329
2012/0127938 A1* 5/2012 Lv ..................... H04W 72/1205
370/329
(Continued)

FOREIGN PATENT DOCUMENTS

CN   101801090 A   8/2010
CN   101932070 A   12/2010
(Continued)

OTHER PUBLICATIONS

International Search Report issued in PCT/CN2018/084265 dated Jul. 17, 2018.
(Continued)

*Primary Examiner* — Sithu Ko
(74) *Attorney, Agent, or Firm* — Harness, Dickey & Pierce, P.L.C.

(57) ABSTRACT

A method for detecting and receiving a downlink control channel, a User Equipment (UE), and a network side device are provided. The method includes: determining, by a UE, a first detection time parameter indicated by a network side device for detection and reception of the downlink control channel; and selecting, by the UE, a corresponding downlink control channel time domain resource according to the first detection time parameter to detect and receive the downlink control channel.

20 Claims, 8 Drawing Sheets

(51) Int. Cl.
*H04W 4/06* (2009.01)
*H04W 72/12* (2009.01)

(56) References Cited

U.S. PATENT DOCUMENTS

| | | | |
|---|---|---|---|
| 2012/0300616 A1* | 11/2012 | Zeng | H04W 72/1289 |
| | | | 370/216 |
| 2014/0301341 A1 | 10/2014 | Pan | |
| 2015/0181574 A1 | 6/2015 | Lee et al. | |
| 2016/0242203 A1* | 8/2016 | You | H04L 27/2602 |
| 2016/0338110 A1* | 11/2016 | Wang | H04W 74/0833 |
| 2017/0026946 A1 | 1/2017 | Seo et al. | |
| 2017/0303250 A1* | 10/2017 | Shao | H04W 72/042 |
| 2018/0049247 A1* | 2/2018 | Park | H04L 1/00 |
| 2018/0198677 A1* | 7/2018 | Blankenship | H04W 72/044 |
| 2018/0249440 A1* | 8/2018 | Zhang | H04W 68/02 |
| 2019/0069277 A1* | 2/2019 | Awad | H04L 5/0053 |
| 2019/0182811 A1* | 6/2019 | Xu | H04W 72/1268 |

FOREIGN PATENT DOCUMENTS

| | | |
|---|---|---|
| CN | 101998264 A | 3/2011 |
| CN | 102036346 A | 4/2011 |
| CN | 102404076 A | 4/2012 |
| CN | 102869049 A | 1/2013 |
| CN | 103095443 A | 5/2013 |
| CN | 103096477 A | 5/2013 |
| CN | 106455103 A | 2/2017 |
| JP | 2015-530026 A | 10/2015 |
| WO | WO-2014/181981 A1 | 11/2014 |

OTHER PUBLICATIONS

Written Opinion issued in PCT/CN2018/084265 dated Jul. 17, 2018.
International Preliminary Report on Patentability issued in PCT/CN2018/084265 dated Nov. 7, 2019.
Extended European Search Report dated Mar. 10, 2020 issued in corresponding European Application No. 18791327.2.
Chinese Office Action dated Dec. 9, 2019 issued in corresponding Chinese Application No. 201710307053.1.
Chinese Office Action dated Jun. 28, 2020 for CN Application No. 201710307053.1.
Japanese Office Action dated Nov. 4, 2020 for Japanese Patent Application No. 2019-558510.
CATT, "Configurable DL control channel monitoring for power savings", 3GPP TSG RAN WG1 Meeting #88bis, R1-1704574, Spokane, WA, USA, Apr. 3-7, 2017.
Samsung, "Configurations for NR-PDCCH Monitoring", 3GPP TSG RAN WG1 #88bis, R1-1705386, Spokane, WA, USA, Apr. 3-7, 2017.
NTT Docomo, Inc., "PDCCH for URLLC low latency", 3GPP TSG RAN WG1 Meeting #88bis, R1-1705738, Spokane, WA, USA, Apr. 3-7, 2017.
Japanese Office Action dated Aug. 10, 2021 for JP Patent Application No. 2019-558510.
Catt, "Further details of group-common control", Agenda Item 8.1.3.1.3, 3GPP TSG RAN WG1 Meeting #88bis, R1-1704572, Spokane, WA, Apr. 7, 2017.
European Office Action dated Oct. 19, 2021 for Application No. EP 18 791 327.2
Ericsson, "Impact on MAC from PDCCH monitoring occasions", Agenda item 10.3.7.7, 3GPP TSG-RAN WG2#97bis, Tdoc R2-1702648, Apr. 3-7, 2017, Spokane, USA.

* cited by examiner

METHOD FOR DETECTING AND RECEIVING DOWNLINK CONTROL CHANNEL, USER EQUIPMENT AND NETWORK SIDE DEVICE

CROSS-REFERENCE TO RELATED APPLICATIONS

This application is the U.S. national phase of PCT Application No. PCT/CN2018/084265 filed on Apr. 24, 2018, which claims a priority of the Chinese Patent Application No. 201710307053.1 filed on Apr. 28, 2017, which are incorporated herein by reference in their entireties.

TECHNICAL FIELD

The present disclosure relates to the field of communication technology, and in particular, to a method for detecting and receiving a downlink control channel, a User Equipment (UE), and a network side device.

BACKGROUND

With the development of communication technology, more and more services are supported by a user Equipment (UE), and types of the services are becoming more diverse. In addition, the services put higher performance requirements on the UE, such as: higher peak rate, better user experience and experience rate, lower delay, higher reliability, higher spectral efficiency and higher energy efficiency and so on. In order to meet the requirements of more services, the requirements on power consumption of the UE need to be more demanding inevitably. The detection and reception of the downlink control channel is a common service scenario, and the detection and reception of the downlink control channel by the UE is consecutively performed, which causes the UE to consume a higher power.

SUMMARY

An objective of the present disclosure is to provide a method for detecting and receiving a downlink control channel, a User Equipment (UE), and a network side device, so as to solve the problem that the UE consumes a large amount of power.

In order to achieve the above objective, in a first aspect, some embodiments of the present disclosure provide a method for detecting and receiving the downlink control channel, which includes: determining, by a User Equipment (UE), a first detection time parameter indicated by a network side device for detection and reception of a downlink control channel; and selecting, by the UE, a corresponding downlink control channel time domain resource according to the first detection time parameter to detect and receive the downlink control channel.

Optionally, the first detection time parameter is used to indicate a detecting and receiving frequency of the downlink control channel, and the selecting, by the UE, the corresponding downlink control channel time domain resource according to the first detection time parameter to detect and receive the downlink control channel includes: detecting and receiving, by the UE, the downlink control channel on the corresponding downlink control channel time domain resource, according to the detecting and receiving frequency indicated by the first detection time parameter.

Optionally, the first detection time parameter indicates one of N predetermined detecting and receiving frequencies by using log 2 (N) bits, where N being the quantity of the predetermined detecting and receiving frequencies; or the first detection time parameter indicates the detecting and receiving frequency of the downlink control channel by using 1 bit. In a case that the 1 bit has a first value, the first detection time parameter indicates the detection and reception to be performed once in each slot for the downlink control channel, and in a case that the 1 bit has a second value, the first detection time parameter indicates the detection and reception to be performed once on each symbol for the downlink control channel.

Optionally, the first detection time parameter indicates, by using a bitmap, a target time domain resource on which the downlink control channel needs to be detected and received, to the UE; and the selecting, by the UE, the corresponding downlink control channel time domain resource according to the first detection time parameter to detect and receive the downlink control channel includes: selecting, by the UE, a target time domain resource indicated by the first detection time parameter, and performing detection and reception of the downlink control channel on the target time domain resource.

Optionally, the first detection time parameter indicates, to the UE, a target time domain resource set on which the downlink control channel needs to be detected and received, and the target time domain resource set includes at least one time domain resource. The selecting, by the UE, the corresponding downlink control channel time domain resource according to the first detection time parameter to detect and receive the downlink control channel includes: selecting, by the UE, the target time domain resource set indicated by the first detection time parameter, from at least one predefined time domain resource set for the downlink control channel, and performing detection and reception of the downlink control channel on each of the at least one time domain resource in the target time domain resource set. Each of the at least one predefined time domain resource set for the downlink control channel includes at least one time domain resource that is potential for performing detection and reception of the downlink control channel.

Optionally, the first detection time parameter is a detection time parameter explicitly indicated by the network side device, or the first detection time parameter is a detection time parameter determined by pre-negotiation between the UE and the network side device.

Optionally, the determining, by the UE, the first detection time parameter indicated by the network side device for detection and reception of the downlink control channel includes: receiving, by the UE, the first detection time parameter transmitted by the network side device for detection and reception of the downlink control channel; or determining, by the UE, the first detection time parameter pre-negotiated between the UE and the network side device for detection and reception of the downlink control channel.

Optionally, the receiving, by the UE, the first detection time parameter transmitted by the network side device for detection and reception of the downlink control channel includes: receiving, by the UE, a high-layer signaling transmitted by the network side device, where the high-layer signaling includes the first detection time parameter for detection and reception of the downlink control channel; or receiving, by the UE, a broadcast signaling or a multicast signaling transmitted by the network side device, where the broadcast signaling or the multicast signaling includes the first detection time parameter for detection and reception of the downlink control channel.

Optionally, the first detection time parameter is valid within a predetermined time period; and/or the first detection time parameter included in the broadcast signaling is valid for all UEs under the network side device; and the first detection time parameter included in the multicast signaling is valid for a group of the UEs, where the group of the UEs includes one or more UEs.

Optionally, the method further includes: receiving, by the UE, a detection time parameter adjustment message transmitted by the network side device; and selecting, by the UE, a corresponding time domain resource for detection and reception of the downlink control channel, from downlink control channel time domain resources, according to a detection time parameter corresponding to the detection time parameter adjustment message.

Optionally, the detecting time parameter adjustment message is used to indicate the UE to perform detection and reception of the downlink control channel according to a second detection time parameter; or the detection time parameter adjustment message is used to indicate the UE to continue to perform detection and reception of the downlink control channel according to the first detection time parameter.

Optionally, the detecting time parameter adjustment message is used to indicate the UE to perform detection and reception of the downlink control channel according to the second detection time parameter in T downlink control channel time domain resources after receiving the detection time adjustment message, where the T is an integer greater than or equal to 1; or the detection time parameter adjustment message is used to indicate the UE to perform detection and reception of the downlink control channel according to the second detection time parameter in K consecutive time domain resources after receiving the detection time adjustment message, where the K is an integer greater than or equal to 1; or the detection time parameter adjustment message is used to indicate the UE to perform detection and reception of the downlink control channel according to the second detection time parameter until receiving a next detection time parameter adjustment message.

Optionally, the detection time parameter adjustment message includes a broadcast signaling, a multicast signaling, or scheduling of downlink control information.

In a second aspect, some embodiments of the present disclosure further provide a method for detecting and receiving a downlink control channel, which includes: indicating, by a network side device, a first detection time parameter for detection and reception of the downlink control channel to a User Equipment (UE), where the first detection time parameter is used for the UE to select a corresponding downlink control channel time domain resource according to the first detection time parameter to detect and receive the downlink control channel.

Optionally, the first detection time parameter is used to indicate a detecting and receiving frequency of the downlink control channel.

Optionally, the first detection time parameter indicates one of N predetermined detecting and receiving frequencies by using log 2 (N) bits, where N is the quantity of the predetermined detecting and receiving frequencies; or the first detection time parameter indicates the detecting and receiving frequency of the downlink control channel by using 1 bit, where in a case that the 1 bit has a first value, the first detection time parameter indicates the detection and reception to be performed once in each slot for the downlink control channel, and in a case that the 1 bit has a second value, the first detection time parameter indicates the detection and reception to be performed once on each symbol for the downlink control channel.

Optionally, the first detection time parameter indicates, by using a bitmap, a target time domain resource on which the downlink control channel needs to be detected and received, to the UE.

Optionally, the first detection time parameter indicates, to the UE, a target time domain resource set on which the downlink control channel needs to be detected and received, and the target time domain resource set includes at least one time domain resource.

Optionally, the first detection time parameter is a detection time parameter explicitly indicated by the network side device, or the first detection time parameter is a detection time parameter determined by pre-negotiation between the UE and the network side device.

Optionally, the indicating, by the network side device, the first detection time parameter for detection and reception of the downlink control channel to the UE includes: transmitting, by the network side device, the first detection time parameter for detection and reception of the downlink control channel to the UE; or implicitly indicating, by the network side device, the first detection time parameter for detection and reception of the downlink control channel to the UE.

Optionally, the transmitting, by the network side device, the first detection time parameter for detection and reception of the downlink control channel to the UE includes: transmitting, by the network side device, a high-layer signaling to the UE, where the high-layer signaling includes the first detection time parameter for detection and reception of the downlink control channel; or transmitting, by the network side device, a broadcast signaling or a multicast signaling to the UE, where the broadcast signaling or the multicast signaling includes the first detection time parameter for detection and reception of the downlink control channel.

Optionally, the first detection time parameter is valid within a predetermined time period; and/or the first detection time parameter included in the broadcast signaling is valid for all UEs under the network side device; and the first detection time parameter included in the multicast signaling is valid for a group of the UEs, where the group of the UEs includes one or more UEs.

Optionally, the method further includes: transmitting, by the network side device, a detection time parameter adjustment message to the UE, where the detection time parameter adjustment message is used for the UE to select, from the downlink control channel time domain resource, a corresponding time domain resource for detection and reception of the downlink control channel according to a detection time parameter corresponding to the detection time parameter adjustment message.

Optionally, the detecting time parameter adjustment message is used to indicate the UE to perform detection and reception of the downlink control channel according to a second detection time parameter; or the detection time parameter adjustment message is used to indicate the UE to continue to perform detection and reception of the downlink control channel according to the first detection time parameter.

Optionally, the detecting time parameter adjustment message is used to indicate the UE to perform detection and reception of the downlink control channel according to the second detection time parameter in T downlink control channel time domain resources after receiving the detection time adjustment message, where the T is an integer greater than or equal to 1; or the detection time parameter adjustment message is used to indicate the UE to perform detection and reception of the downlink control channel according to the second detection time parameter in K consecutive time domain resources after receiving the detection time adjustment message, where the K is an integer greater than or equal to 1; or the detection time parameter adjustment message is used to indicate the UE to perform detection and reception of the downlink control channel according to the second detection time parameter until receiving a next detection time parameter adjustment message.

Optionally, the detection time parameter adjustment message includes a broadcast signaling, a multicast signaling, or scheduling of downlink control information.

In a third aspect, some embodiments of the present disclosure further provide a User Equipment (UE), which includes: a determining module, configured to determine a first detection time parameter indicated by a network side device for detection and reception of a downlink control channel; and a first detecting module, configured to select a corresponding downlink control channel time domain resource according to the first detection time parameter to detect and receive the downlink control channel.

Optionally, the first detection time parameter is used to indicate a detecting and receiving frequency of the downlink control channel, and the first detecting module is configured to detect and receive the downlink control channel on the corresponding downlink control channel time domain resource, according to the detecting and receiving frequency indicated by the first detection time parameter.

Optionally, the first detection time parameter indicates one of N predetermined detecting and receiving frequencies by using log 2 (N) bits, where N is the quantity of the predetermined detecting and receiving frequencies; or the first detection time parameter indicates the detecting and receiving frequency of the downlink control channel by using 1 bit, where in a case that the 1 bit has a first value, the first detection time parameter indicates the detection and reception to be performed once in each slot for the downlink control channel, and in a case that the 1 bit has a second value, the first detection time parameter indicates the detection and reception to be performed once on each symbol for the downlink control channel.

Optionally, the first detection time parameter indicates, to the UE, a target time domain resource by using a bitmap, a target time domain resource on which the downlink control channel needs to be detected and received, to the UE; and the first detecting module is configured to select a target time domain resource indicated by the first detection time parameter, and perform detection and reception of the downlink control channel on the target time domain resource.

Optionally, the first detection time parameter indicates, to the UE, a target time domain resource set on which the downlink control channel needs to be detected and received, and the target time domain resource set includes at least one time domain resource; and the first detecting module is configured to select the target time domain resource set indicated by the first detection time parameter, in at least one predefined time domain resource set for the downlink control channel, and perform detection and reception of the downlink control channel on each of the at least one time domain resource in the target time domain resource set; where each of the at least one predefined time domain resource set for the downlink control channel includes at least one time domain resource that is potential for performing detection and reception of the downlink control channel.

Optionally, the first detection time parameter is a detection time parameter explicitly indicated by the network side device, or the first detection time parameter is a detection time parameter determined by pre-negotiation between the UE and the network side device.

Optionally, the determining module is configured to receive the first detection time parameter transmitted by the network side device for detection and reception of the downlink control channel; or the determining module is configured to determine the first detection time parameter pre-negotiated between the UE and the network side device for detection and reception of the downlink control channel.

Optionally, the determining module is configured to receive a high-layer signaling transmitted by the network side device, where the high-layer signaling includes the first detection time parameter for detection and reception of the downlink control channel; or the determining module is configured to receive a broadcast signaling or multicast signaling transmitted by the network side device, where the broadcast signaling or the multicast signaling includes the first detection time parameter for detection and reception of the downlink control channel.

Optionally, the first detection time parameter is valid within a predetermined time period; and/or the first detection time parameter included in the broadcast signaling is valid for all UEs under the network side device; and the first detection time parameter included in the multicast signaling is valid for a group of the UEs, where the group of the UEs includes one or more UEs.

Optionally, the UE further includes: a receiving module, configured to receive a detection time parameter adjustment message transmitted by the network side device; and a second detecting module, configured to select a corresponding time domain resource for detection and reception of the downlink control channel, from downlink control channel time domain resources, according to the detection time parameter corresponding to the detection time parameter adjustment message.

Optionally, the detecting time parameter adjustment message is used to indicate the UE to perform detection and reception of the downlink control channel according to a second detection time parameter; or the detection time parameter adjustment message is used to indicate the UE to continue to perform detection and reception of the downlink control channel according to the first detection time parameter.

Optionally, the detecting time parameter adjustment message is used to indicate the UE to perform detection and reception of the downlink control channel according to the second detection time parameter in T downlink control channel time domain resources after receiving the detection time adjustment message, where the T is an integer greater than or equal to 1; or the detection time parameter adjustment message is used to indicate the UE to perform detection and reception of the downlink control channel according to the second detection time parameter in K consecutive time domain resources after receiving the detection time adjustment message, where the K is an integer greater than or equal to 1; or the detection time parameter adjustment message is used to indicate the UE to perform detection and reception of the downlink control channel according to the second detection time parameter until receiving a next detection time parameter adjustment message.

Optionally, the detection time parameter adjustment message includes a broadcast signaling, a multicast signaling, or scheduling of downlink control information.

In a fourth aspect, some embodiments of the present disclosure further provide a network side device, which includes: an indicating module, configured to indicate a first detection time parameter for detection and reception of a downlink control channel to a User Equipment (UE), where the first detection time parameter is used for the UE to select a corresponding downlink control channel time domain resource according to the first detection time parameter to detect and receive the downlink control channel.

Optionally, the first detection time parameter is used to indicate a detecting and receiving frequency of the downlink control channel.

Optionally, the first detection time parameter indicates one of N predetermined detecting and receiving frequencies by using log 2 (N) bits, where N is the quantity of the predetermined detecting and receiving frequencies; or the first detection time parameter indicates the detecting and receiving frequency of the downlink control channel by using 1 bit, where in a case that the 1 bit has a first value, the first detection time parameter indicates the detection and reception to be performed once in each slot for the downlink control channel, and in a case that the 1 bit has a second value, the first detection time parameter indicates the detection and reception to be performed once on each symbol for the downlink control channel.

Optionally, the first detection time parameter indicates, to the UE, a target time domain resource by using a bitmap, a target time domain resource on which the downlink control channel needs to be detected and received, to the UE.

Optionally, the first detection time parameter indicates, to the UE, a target time domain resource set on which the downlink control channel needs to be detected and received, and the target time domain resource set includes at least one time domain resource.

Optionally, the first detection time parameter is a detection time parameter explicitly indicated by the network side device, or the first detection time parameter is a detection time parameter determined by pre-negotiation between the UE and the network side device.

Optionally, the indicating module is configured to transmit the first detection time parameter for detection and reception of the downlink control channel to the UE; or the indicating module is configured to implicitly indicate the first detection time parameter for detection and reception of the downlink control channel to the UE.

Optionally, the indicating module is configured to transmit a high-layer signaling to the UE, where the high-layer signaling includes the first detection time parameter for detection and reception of the downlink control channel; or the indicating module is configured to transmit a broadcast signaling or a multicast signaling to the UE, where the broadcast signaling or the multicast signaling includes the first detection time parameter for detection and reception of the downlink control channel.

Optionally, the first detection time parameter is valid within a predetermined time period; and/or the first detection time parameter included in the broadcast signaling is valid for all UEs under the network side device; and the first detection time parameter included in the multicast signaling is valid for a group of the UEs, where the group of the UEs includes one or more UEs.

Optionally, the network side device further includes: an adjusting module, configured to transmit a detection time parameter adjustment message to the UE, where the detection time parameter adjustment message is used for the UE to select a corresponding time domain resource for detection and reception of the downlink control channel, from downlink control channel time domain resources, according to the detection time parameter corresponding to the detection time parameter adjustment message.

Optionally, the detecting time parameter adjustment message is used to indicate the UE to perform detection and reception of the downlink control channel according to a second detection time parameter; or the detection time parameter adjustment message is used to indicate the UE to continue to perform detection and reception of the downlink control channel according to the first detection time parameter.

Optionally, the detecting time parameter adjustment message is used to indicate the UE to perform detection and reception of the downlink control channel according to the second detection time parameter in T downlink control channel time domain resources after receiving the detection time adjustment message, where the T is an integer greater than or equal to 1; or the detection time parameter adjustment message is used to indicate the UE to perform detection and reception of the downlink control channel according to the second detection time parameter in K consecutive time domain resources after receiving the detection time adjustment message, where the K is an integer greater than or equal to 1; or the detection time parameter adjustment message is used to indicate the UE to perform detection and reception of the downlink control channel according to the second detection time parameter until receiving a next detection time parameter adjustment message.

Optionally, the detection time parameter adjustment message includes a broadcast signaling, a multicast signaling, or scheduling of downlink control information.

In a fifth aspect, some embodiments of the present disclosure further provide a User Equipment (UE), which includes: a processor and a storage, where the storage is configured to store a program that may be executed by the processor, and data, and the processor is configured to read the program in the storage to perform the method according to the above first aspect.

In a sixth aspect, some embodiments of the present disclosure further provide a network side device, which includes: a processor and a storage, where the storage is configured to store a program that may be executed by the processor, and data, and the processor is configured to read the program in the storage to perform the method according to the above second aspect.

In a seventh aspect, some embodiments of the present disclosure further provide a non-volatile computer readable storage medium, which includes a program and an instruction that are stored on the non-volatile computer readable storage medium, where the program and the instruction are executed by a processor to perform the method according to the above first.

In an eighth aspect, some embodiments of the present disclosure further provide a non-volatile computer readable storage medium, which includes a program and an instruction that are stored on the non-volatile computer readable storage medium, where the program and the instruction are executed by a processor to perform the method according to the above second aspect.

The above technical solutions of the present disclosure at least have the following advantageous effects: in some embodiments of the present disclosure, the UE determines a first detection time parameter indicated by the network side device for detection and reception of the downlink control channel, and the UE selects a corresponding downlink control channel time domain resource according to the first detection time parameter to detect and receive the downlink control channel; in this way, it is able for the UE to perform detection and reception of the downlink control channel only on the corresponding downlink control channel time domain resource, thereby reducing power consumption of the UE.

DETAILED DESCRIPTION

In order to make technical problems, technical solutions, and advantages of the present disclosure clearer, a detailed description is given below with reference to the accompanying drawings and specific embodiments.

Figure 1:
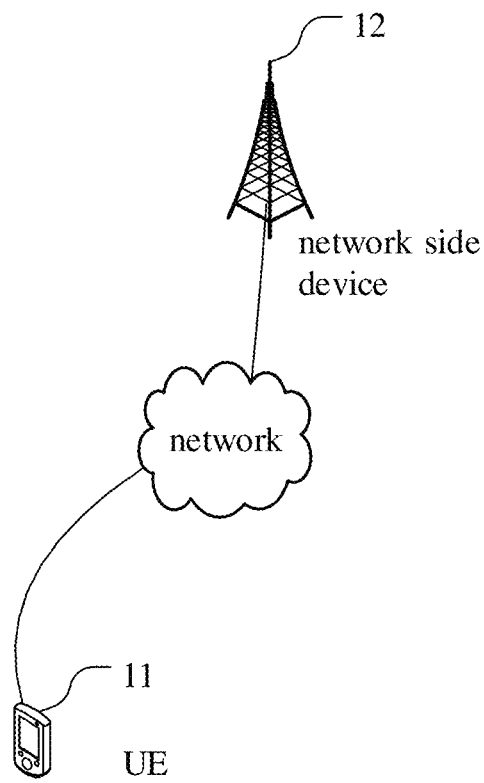
FIG. 1 is a schematic view of a network structure to which some embodiments of the present disclosure may be applied.

Reference is made to FIG. 1, which is a schematic view of a network structure to which some embodiments of the present disclosure may be applied. As shown in FIG. 1, the network structure includes a User Equipment (UE) 11 and a network side device 12, where the UE 11 may be a UE-side device such as a mobile phone, a tablet personal computer (tablet), a laptop computer, a personal digital assistants (PDA), a mobile Internet devices (MID), or a wearable device, etc. It is noted that the specific type of UE 11 is not limited in some embodiments of the present disclosure. The UE 11 may establish communication with the network side device 12, where the network in the figure may indicate that the UE 11 wirelessly establishes communication with the network side device 12, and the network side device 12 may be an evolved Node B (eNB) or other base stations, or may be a network side device such as an access point device. It should be noted that the specific type of the network side device 12 is not limited in some embodiments of the present disclosure.

Figure 2:
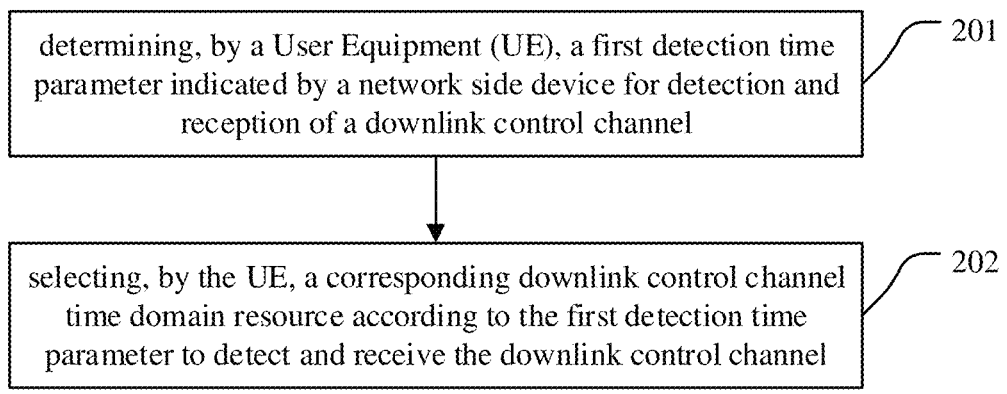
FIG. 2 is a flow chart of a method for detecting and receiving a downlink control channel according to some embodiments of the present disclosure.

Reference is made to FIG. 2, which is a flow chart of a method for detecting and receiving a downlink control channel according to some embodiments of the present disclosure. As shown in FIG. 2, the method includes the following steps 201 and 202.

Step 201: determining, by a User Equipment (UE), a first detection time parameter indicated by a network side device for detection and reception of a downlink control channel.

Step 202: selecting, by the UE, a corresponding downlink control channel time domain resource according to the first detection time parameter to detect and receive the downlink control channel.

The first detection time parameter may be explicitly indicated by the network side device, for example, by transmitting an explicit signaling to the UE and indicating the first detection time parameter in the signaling, and the explicit signaling may be pre-transmitted, e.g., an RRC (Radio Resource Control) signaling. The above first detection time parameter may be implicitly indicated by the network side device, for example, it is predetermined by the network side device negotiating with the UE, or the network side device may also implicitly indicate the first detection time parameter through a specific service scheduling signaling. That is, for different services, the UE may perform the detection by using different first detection time parameters.

In addition, the above first detection time parameter may be configured to indicate the UE to perform detection and reception of the downlink control channel on a specific time domain resource, or indicate the UE to perform detection and reception of the downlink control channel according to a specific frequency. For example, the detection and reception is performed once on every three downlink control channel time domain resources.

After the above first detection time parameter is determined by the UE, a corresponding downlink control channel time domain resource may be selected to perform the detection and reception of the downlink control channel. For example, in a case that the first detection time parameter indicates the detection and reception to be performed once on every three downlink control channel time domain resources, the UE selects one time domain resource from every three downlink control channel time domain resource for detection and reception of the downlink control channel. For example, in a case that the time domain resource is an Orthogonal Frequency Division Multiplexing (OFDM) symbol, the UE may perform detection and reception of the downlink control channel on one OFDM symbol of the actually transmitted downlink control channel in every three OFDM symbols. The OFDM symbol of the actually transmitting downlink control channel may be notified by the network side device to the UE.

In addition, in some embodiments of the present disclosure, the downlink control channel time domain resource may be a time domain resource that is possibly configured to transmit a downlink control channel thereon, or may be a time domain resource that actually transmits a downlink control channel. The time domain resource may be an OFDM symbol, or may be a slot, or may also be a subframe, or other time domain resources. Further, the time domain resource may also be understood as a time domain location.

With the above steps, the UE can perform detection and reception of the downlink control channel only on the corresponding downlink control channel time domain resources, thereby reducing power consumption of the UE.

Optionally, the above first detection time parameter is used to indicate a detecting and receiving frequency of the downlink control channel; and the selecting, by the UE, the corresponding downlink control channel time domain resource according to the first detection time parameter to detect and receive the downlink control channel includes: detecting and receiving, by the UE, the downlink control channel on the corresponding downlink control channel time domain resource, according to the detecting and receiving frequency indicated by the first detection time parameter.

The above detecting and receiving frequency may be configured to indicate the detection and reception to be performed once on every M downlink control channel time domain resources. For example, the detection and reception is performed once on every two downlink control channel OFDM symbols, or the detection and reception is performed once on every downlink control channel OFDM symbol, or the detection and reception is performed once on every seven or fourteen downlink control channel OFDM symbols. For example, the above detecting and receiving frequency may also be configured to indicate the detection and reception to be performed once in every time resource set. For example, the detection and reception is performed once in every downlink control channel slot. The above downlink control channel OFDM symbol may be an OFDM symbol that is likely to be configured to transmit the downlink control channel thereon, or an OFDM symbol that actually transmits the downlink control channel thereon, and the above downlink control channel slot may be a slot in which the downlink control channel may be transmitted or is transmitted. That is, in this slot, there is one or more OFDM symbols that have an occasion or potential to transmit the downlink control channel, or transmits the downlink control channel.

In the embodiments, the above detecting and receiving frequency enables power consumption of the UE to be further saved.

Optionally, the above first detection time parameter indicates one of N predetermined detecting and receiving frequencies by using log 2 (N) bits, where N is the quantity of the predetermined detecting and receiving frequencies.

The N detecting and receiving frequencies may be pre-negotiated by the network side device with the UE, or may be pre-configured by the network side device to the UE. Since the first detection time parameter may be indicated by log 2 (N) bits, the transmission overhead is saved. For example, if the possible time frequency at which the UE detects and receives the downlink control channel is OFDM symbols with the number of {1 2 7 14}, then the base station needs to notify the UE of the time frequency of detection and reception of the downlink control channel by using 2 bit information, i.e., the first detection time parameter. For example, the binary code 00 indicates that the detection time frequency indicated by the first detection time parameter is 1 OFDM symbol, that is, the UE needs to detect and receive the downlink control channel in each downlink control channel OFDM symbol; for another example, the binary code 01 indicates that the detection time frequency is 2 OFDM symbols. That is, detection and reception is performed once on every two downlink control channel OFDM symbols; for example, detection and reception is performed once on every other downlink control channel OFDM symbol. It should be noted that the two downlink control channel OFDM symbols may be two consecutive or non-consecutive OFDM symbols in the time domain. For another example, the binary code 11 indicates that the time frequency of detection and reception of the downlink control channel is 7 OFDM symbols. That is, detection and reception is performed once on every seven downlink control channel OFDM symbols; for example, detection and reception is performed once on every other six downlink control channel OFDM symbols. For still another example, the binary code 10 indicates that the detection time frequency is 14 OFDM symbols. That is, detection and reception is performed once on every fourteen downlink control channel OFDM symbols; for example, detection and reception is performed once on every other thirteen downlink control channel OFDM symbols.

Figure 3:
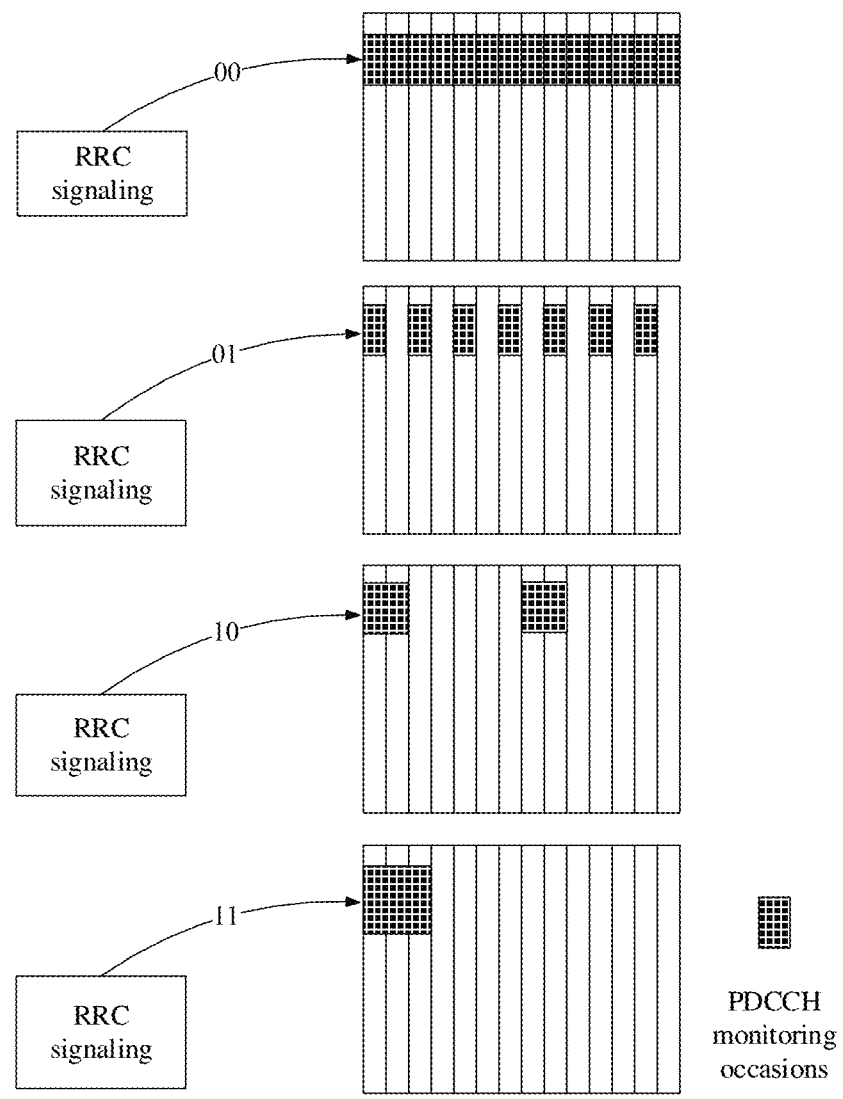
FIG. 3 is a schematic view showing a detection and reception of a downlink control channel according to some embodiments of the present disclosure.

This embodiment is exemplified below, it is assumed that each slot is composed of 7 OFDM symbols. The minimum time frequency at which the UE detects and receives the downlink control channel is detecting and receiving the downlink control channel by the UE on each OFDM symbol, and the maximum time frequency at which the UE detects and receives the downlink control channel is detecting and receiving the downlink control channel by the UE on every fourteen OFDM symbols. It is assumed that there are N kinds of frequencies at which the UE detects the downlink control channel, and N=4 in this embodiment. For example, the downlink control channel is transmitted once on every OFDM symbol, every 2 OFDM symbols, every 7 OFDM symbols, and every 14 OFDM symbols. The network side device may need to indicate the UE the frequency of detection and reception of the downlink control channel by using high-layer signaling information with 2 (ceil (log 2(4))=2) bits. The network side device notifies the information through a high-layer signaling, such as RRC signaling. Specifically, the binary code 00 indicates that the UE needs to detect and receive the downlink control channel on each OFDM symbol, the binary code 01 indicates that the UE needs to detect and receive the downlink control channel once on every 2 OFDM symbols, the binary code 10 indicates that the UE needs to detect and receive the downlink control channel once on every 7 OFDM symbols, and the binary code 11 indicates that the UE needs to detect and receive the downlink control channel once on every 14 symbols. The network side device notifies the UE the frequency of detection and reception of the downlink control channel through the high-layer signaling, for example, RRC signaling. After receiving the RRC signaling, the UE detects and receives the downlink control channel at a certain time frequency, according to indication information on the time frequency of detection and reception of the downlink control channel, which is notified by the RRC signaling. For example, if the frequency of detection and reception of the downlink control channel notified by the network side device is 1 OFDM symbol, the UE needs to try to detect and receive its downlink control channel on each OFDM symbol. For example, if the time frequency of detection and reception of the downlink control channel notified by the network side device is 2 OFDM symbols, then the UE needs to try to detect and receive its downlink control channel on every 2 OFDM symbols, and so on, as shown in FIG. 3. It should be noted that a resource detecting location (also referred to as monitoring occasion) of the physical downlink control channel (PDCCH) in the figure does not represent a specific resource location, and only indicates that the UE needs or requires to detect and receive the downlink control channel on these OFDM symbols or in the slot.

Optionally, the first detection time parameter indicates the detecting and receiving frequency of the downlink control channel by using 1 bit, where if the 1 bit has a first value, the first detection time parameter indicates the detection and reception to be performed once in each slot for the downlink control channel, and if the 1 bit has a second value, the first detection time parameter indicates the detection and reception to be performed once on each symbol for the downlink control channel.

In this embodiment, it is also able to further save transmission overhead by indicating the first detection time parameter using 1 bit. For example, binary code 0 indicates that the UE performs detection and reception once in each slot for the downlink control channel; and binary code 1 indicates that the UE detects and receives the downlink control channel on each OFDM symbol.

Optionally, the first detection time parameter indicates, by using a bitmap, a target time domain resource on which the downlink control channel needs to be detected and received, to the UE.

The selecting, by the UE, the corresponding downlink control channel time domain resource according to the first detection time parameter to detect and receive the downlink control channel includes: selecting, by the UE, a target time domain resource indicated by the first detection time parameter, and performing detection and reception of the downlink control channel on the target time domain resource.

In this embodiment, by indicating using a bitmap, it is able to accurately indicate the UE to perform detection and reception of the downlink control channel on the corresponding time resources. For example, if a slot contains 7 OFDM symbols, the network side device may notify the UE of a symbol in each slot, on which the downlink control channel needs to be detected and received, by using a bitmap of a length of 7, where binary code 1 indicates that the downlink control channel needs to be detected and received on this symbol, and binary code 0 indicates that the downlink control channel does not need to be detected and received on this symbol.

Figure 4:
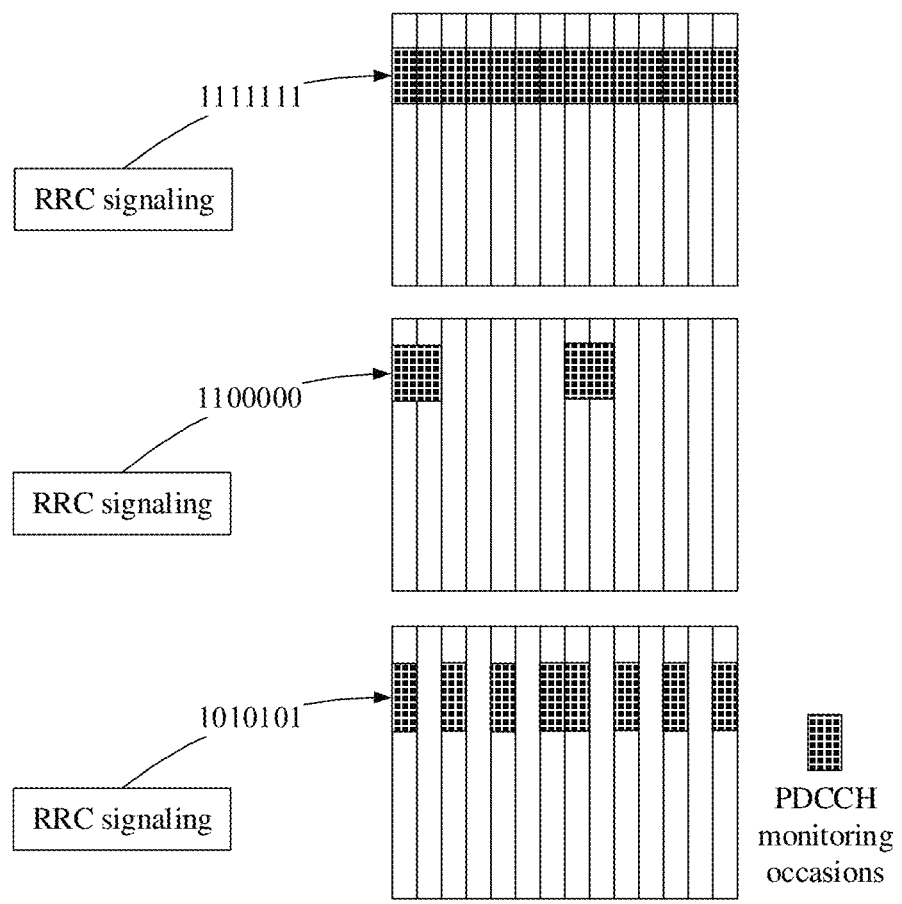
FIG. 4 is a schematic view showing another detection and reception of a downlink control channel according to some embodiments of the present disclosure.

This embodiment is exemplified below, it is assumed that each slot is composed of 7 OFDM symbols. The minimum time frequency at which the UE detects and receives the downlink control channel is detecting and receiving the downlink control channel by the UE on each OFDM symbol. The network side device notifies the UE of the time frequency of detection and reception of the downlink control channel by means of a bitmap, for example, through a 7-bit bitmap. Each bit represents one OFDM symbol, where binary code 1 indicates that the UE needs to detect and receive the downlink control channel on the corresponding OFDM symbol, and binary code 0 indicates that the UE does not need to detect and receive the downlink control channel on the OFDM symbol. The network side device notifies the UE of the detection time parameter for the downlink control channel by using high-layer signaling, for example, RRC signaling carrying the bitmap. After receiving the RRC signaling, the UE determines the time domain resources for detection and reception of the downlink control channel according to the bitmap carried therein, and detects and receives the downlink control channel on the time domain resources. For example, if the bitmap is 1000000, it indicates that the UE only needs to detect and receive the downlink control channel on the first OFDM symbol of each slot, 1100000 indicates that the UE only needs to detect and receive the downlink control channel on the first and second OFDM symbols of each slot, and 1111111 indicates that the UE needs to detect and receive the downlink control channel on each symbol of the slot. The network side device may flexibly indicate the UE to detect and receive the time domain resources for the downlink control channel as needed. A specific example may be shown in FIG. 4. It should be noted that the monitoring occasion of the PDCCH in the figure does not represent a specific resource location, and only indicates that on this OFDM symbol or in the slot, the UE needs to detect and receive the downlink control channel.

Optionally, the first detection time parameter indicates, to the UE, a target time domain resource set on which the downlink control channel needs to be detected and received, and the target time domain resource set includes at least one time domain resource.

The selecting, by the UE, the corresponding downlink control channel time domain resource according to the first detection time parameter to detect and receive the downlink control channel includes: selecting, by the UE, the target time domain resource set indicated by the first detection time parameter, from at least one predefined time domain resource set for the downlink control channel, and performing detection and reception of the downlink control channel on each of the at least one time domain resource in the target time domain resource set; where each of the at least one predefined time domain resource set for the downlink control channel includes at least one time domain resource that is likely to be configured to detect and receive the downlink control channel.

In this embodiment, the time domain resource that needs to detect and receive the downlink control channel is indicated by the time domain resource set for the downlink control channel to save transmission overhead. For example, the UE may number all possible detection and reception locations of the downlink control channel within a certain time, for example, within one slot, group them, select one of subsets in each slot according to a certain principle, and detect and receive the downlink control channel at the time domain locations included in the subset.

Assuming that there are 7 OFDM symbols in a slot, the downlink control channel may be transmitted on each OFDM symbol. All possible detection and reception locations of the downlink control channel are numbered and grouped. One of subsets in each slot is selected according to a certain principle, and the downlink control channel is detected and received at the time domain locations included in the subset, for example, within one slot. The downlink control channel may be transmitted on each OFDM symbol, where the downlink control channel transmitted on OFDM symbol 1 is labeled as occasion1, the downlink control channel transmitted on OFDM symbol 2 is labeled as occasion2, and so on, and the downlink control channel transmitted on OFDM symbol 7 is labeled as occasion7. Occasion1 to occasion7 are grouped, for example, grouped into {occasion1, occasion3, occasion5, occasion7} and {occasion2, occasion4, occasion6}. Within each slot, one of the subsets therein is selected according to a predefined rule (a rule pre-negotiated and determined by the UE with the network side device) to detect and receive the downlink control channel at the time domain locations included in this subset.

Figure 5:
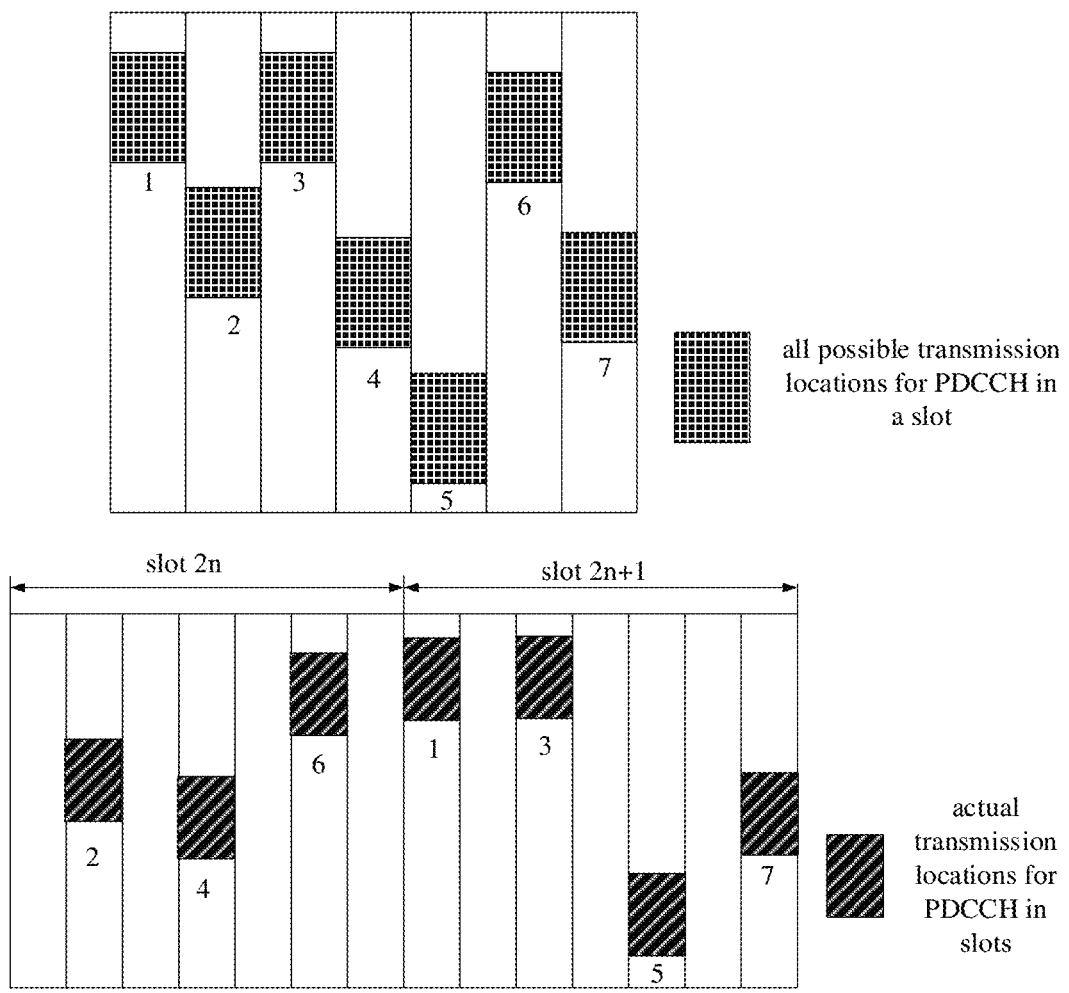
FIG. 5 is a schematic view showing another detection and reception of a downlink control channel according to some embodiments of the present disclosure.

For example, a subset of locations at which the downlink control channel needs to be detected and received is selected in this slot according to the parity of the serial number of the slot. Specifically, when the serial number of the slot is an odd number, the downlink control channel is detected and received on the first, third, fifth, and seventh OFDM symbols of the subframe according to the subset 1, i.e., {occasion1, occasion3, occasion5, and occasion7}; and when the serial number of the slot is an even number, the downlink control channel is detected and received on the second, fourth and sixth OFDM symbols of the subframe according to the subset 2, i.e., {occasion2, occasion4, occasion6}, for example, as shown in FIG. 5.

Optionally, the first detection time parameter is a detection time parameter explicitly indicated by the network side device, or the first detection time parameter is a detection time parameter pre-negotiated and determined by the UE and the network side device.

The above explicit indication may be that the network side device indicates the detection time parameter to the UE by a signaling, for example, a high-layer signaling, and the above pre-negotiation and determination may be that the detection time parameter is pre-negotiated by the network side device and the UE. For example, the UE selects the above target time domain resource set according to a pre-defined rule.

It should be noted that if only one time domain resource set is defined in advance, the UE may directly select the time domain resource set, that is, the network side device and the UE pre-negotiate and determine to detect and receive the downlink control channel in the time domain resource set.

Optionally, the determining, by the UE, the first detection time parameter indicated by the network side device for detection and reception of the downlink control channel includes: receiving, by the UE, the first detection time parameter transmitted by the network side device for detection and reception of the downlink control channel; or determining, by the UE, the first detection time parameter pre-negotiated with the network side device for detection and reception of the downlink control channel.

In this embodiment, the UE may explicitly or implicitly receive the first detection time parameter indicated by the network side device, where the implicit indication may be pre-negotiated and determined by the network side device and the UE, thereby saving transmission overhead.

Optionally, the receiving, by the UE, the first detection time parameter transmitted by the network side device for detection and reception of the downlink control channel includes: receiving, by the UE, a high-layer signaling transmitted by the network side device, where the high-layer signaling includes the first detection time parameter for detection and reception of the downlink control channel; or receiving, by the UE, a broadcast signaling or a multicast signaling transmitted by the network side device, where the broadcast signaling or the multicast signaling includes the first detection time parameter for detection and reception of the downlink control channel.

The above high-layer signaling may be a terminal-specific signaling, for example, a UE-specific signaling. Of course, other signaling are also possible, which are not limited in some embodiments of the present disclosure, such as RRC signaling, and the like.

Optionally, the first detection time parameter is valid within a predetermined time period; and/or the first detection time parameter included in the broadcast signaling is valid for all UEs under the network side device; and the first detection time parameter included in the multicast signaling is valid for a group of UEs, where the group of UEs includes one or more UEs.

The above predetermined time period may be a specific duration, or a predetermined quantity of time domain resources, etc.

Optionally, the method further includes: receiving, by the UE, a detection time parameter adjustment message transmitted by the network side device; and selecting, by the UE, a corresponding time domain resource for detection and reception of the downlink control channel according to the detection time parameter corresponding to the detection time parameter adjustment message, from the downlink control channel time domain resources.

In this embodiment, the detection time parameter of the UE may be flexibly adjusted. The detection time parameter corresponding to the detection time parameter adjustment message may be that: the second detection time parameter included in the detection time parameter adjustment message, or the detection time parameter corresponding to the above detection time parameter adjustment message may be the above first detection time parameter, that is, the detection time parameter adjustment message indicates the UE to continue to perform detection and reception of the downlink control channel according to the first detection time parameter. In addition, the above detecting time parameter adjustment message may be configured to select, in one or more slots, the corresponding time domain resource for detection and reception of the downlink control channel, according to the detection time parameter corresponding to the detection time parameter adjustment message.

Optionally, the detecting time parameter adjustment message is used to indicate the UE to perform detection and reception of the downlink control channel according to a second detection time parameter; or the detection time parameter adjustment message is used to indicate the UE to continue to perform detection and reception of the downlink control channel according to the first detection time parameter.

For example, the second detection time parameter may be 1 bit indication information. When a value of the indication information is 0, it indicates that the UE detects that the time frequency at which the UE detects and receives the downlink control channel is each slot or one OFDM symbol; when the value of the indication information is 1, it indicates that the UE continues to perform detection and reception of the downlink control channel according to the above first detection time parameter. Optionally, the above second detection time parameter may indicate, by using a ceil (log 2 (N)) bit, the frequency or time domain resource in one or more slots for the UE to detect and receive the downlink control channel, where the N is the predetermined quantity of detecting and receiving frequency. Optionally, the above second detection time parameter may be configured to adjust the time domain resource in one or more slots for the UE to detect and receive the downlink control channel by using a bitmap, for example, by using M bits, where M=7, and 0 in the bitmap indicates that it is not required to detect and receive the downlink control channel on this OFDM symbol or in the minimum slot (mini-slot), where the minimum slot may be composed of one or more OFDM symbols, and may be a minimum resource granularity of the time domain resource, and 1 in the bitmap indicates that it is required to detect and receive the downlink control channel on this OFDM symbol or in the mini-slot.

Optionally, the detecting time parameter adjustment message indicates the UE to perform detection and reception of the downlink control channel in T downlink control channel time domain resources according to the second detection time parameter after receiving the detection time adjustment message, where the T is an integer greater than or equal to 1.

The T downlink control channel time domain resources may be pre-negotiated and determined by the network side device and the UE, or pre-configured by the network side device to the UE, or indicated in the above detection time parameter adjustment message.

In this embodiment, it is possible to perform detection and reception of the downlink control channel in T downlink control channel time domain resources according to the second detection time parameter after the detection time adjustment message is received. For example, the detection time parameter adjustment message includes 1 bit indication information, indicating that in the subsequent N OFDM symbols, the UE detects and receives the downlink control channel according to the slot or according to each OFDM symbol, where N is a positive integer greater than or equal to 1, for example, N=7. Specifically, when the indication bit is 0, it indicates that the UE detects and receives the downlink control channel according to the slot, that is, it performs detection and reception in each slot. When the indication bit is 1, it indicates that the UE detects and receives the downlink control channel according to the OFDM symbol, that is, in the subsequent N OFDM symbols, the UE detects and receives the downlink control channel on each OFDM symbol.

Optionally, the detection time parameter adjustment message indicates the UE to perform detection and reception of the downlink control channel in K consecutive time domain resources according to the second detection time parameter after receiving the detection time adjustment message, where the K is an integer greater than or equal to 1.

The K downlink control channel time domain resources may be pre-negotiated and determined by the network side device and the UE, or pre-configured by the network side device to the UE, or indicated in the above detection time parameter adjustment message.

In this embodiment, it is possible to perform detection and reception of the downlink control channel according to the second detection time parameter in K consecutive time domain resources, so as to achieve flexible adjustment of the detection time parameter. For example, the detection time parameter adjustment message may include a ceil (log 2(N)) bit indicating the second detection time parameter used by the UE to detect and receive the downlink control channel, and the time duration during which the updated frequency of detection and reception of the downlink control channel takes effect is a current slot or predefined multiple consecutive slots.

Optionally, the detection time parameter adjustment message indicates the UE to perform detection and reception of the downlink control channel according to the second detection time parameter until receiving a next detection time parameter adjustment message.

In this embodiment, it is possible to perform detection and reception of the downlink control channel according to the second detection time parameter until a next detection time parameter adjustment message is received.

Optionally, the detection time parameter adjustment message includes broadcast signaling, multicast signaling, or scheduling of downlink control information (DCI).

For example, the network side device configures the first detection time parameter for detection and reception of the downlink control channel to the UE by a higher-layer signaling. For the first detection time parameter, reference may be made to any of the foregoing embodiments. After the network side device configures the first detection time parameter for detection and reception of the downlink control channel to the UE by the higher-layer signaling, the detection time parameter for detection and reception of the downlink control channel by the UE is adjusted based on the indication information carried in the multicast channel. The multicast channel is valid for a group of UEs, that is, it can only be received by a group of UEs, and thus the information carried in the multicast channel is only valid for this group of UEs. For example, if the multicast channel is valid for the UE1 to UE5, then the UE1 to UE5 may adjust the frequency or location of the downlink control channel according to the indication information carried in the multicast channel.

Specifically, the indication information carried in the multicast channel may adjust the detection time parameter for detection and reception of the downlink control channel by the UE in the following way: by using 1 bit indication information. When a value of the indication information is 0, it indicates that the frequency at which the UE detects and receives the downlink control channel is 1 slot or 1 symbol; and when the value of the indication information is 1, it indicates that the frequency at which the UE detects and receives the downlink control channel is a time frequency configured by the higher-layer signaling, as shown by B in FIG. 6.

Optionally, the ceil (log 2(N)) bit may be used to indicate the frequency at which the UE detects and receives the downlink control channel in one or more slots, where the N represents the quantity of detecting and receiving frequencies at which the UE detects and receives the downlink control channel. In this embodiment, it is assumed that N=4, that is, the detecting and receiving frequencies at which the UE detects and receives the downlink control channel is {1 2 7 14} OFDM symbols, as shown by A in FIG. 6.

Optionally, the UE may adjust the time domain resource on which the UE detects and receives the downlink control channel in one or more slots by using a bitmap. In this embodiment, the length of the bitmap is assumed to be 7, as shown by C in FIG. 6.

Figure 6:
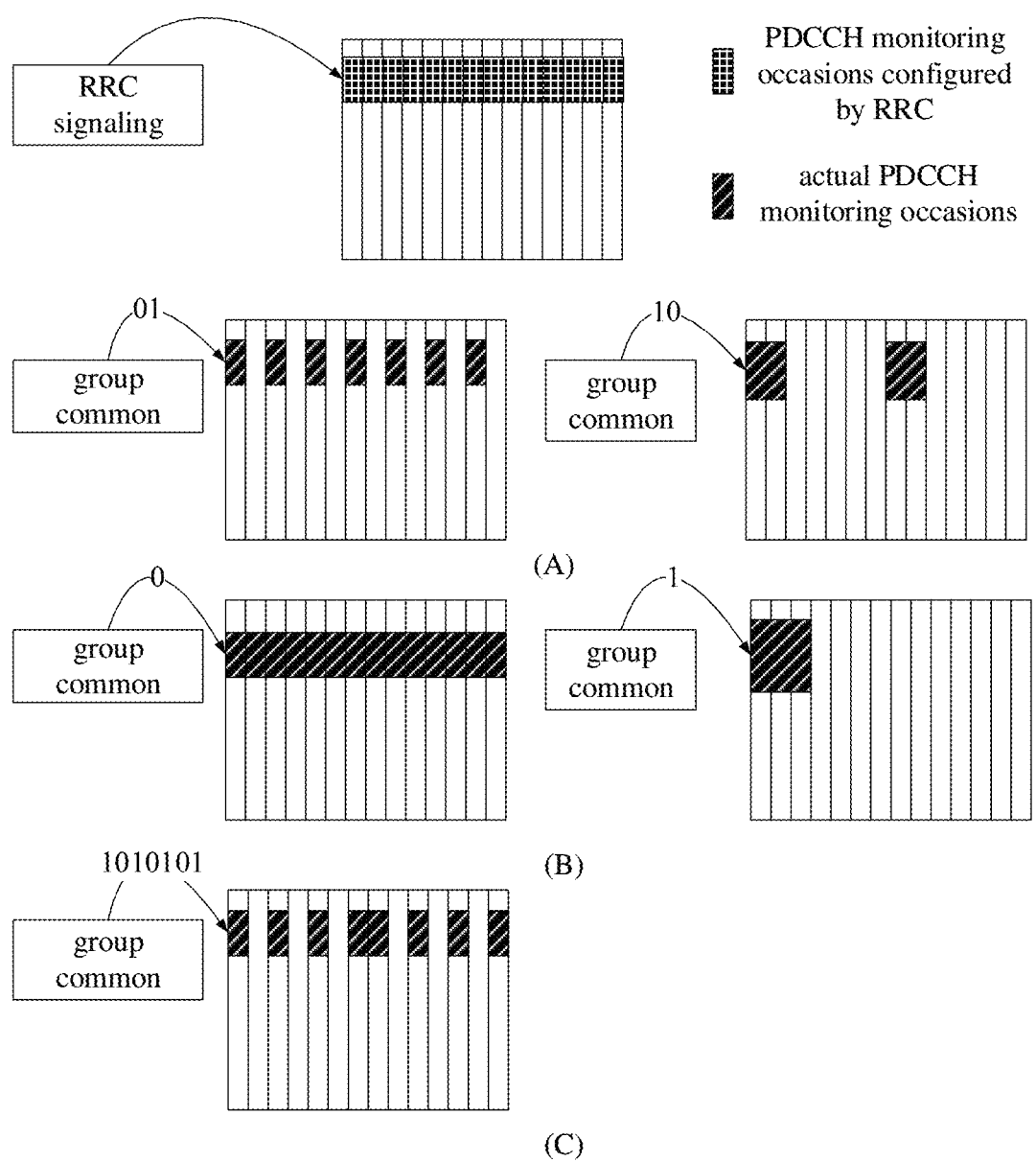
FIG. 6 is a schematic view showing another detection and reception of a downlink control channel according to some embodiments of the present disclosure.

In this example, it is assumed that the first detection time parameter for detection and reception of the downlink control channel by the UE is configured by RRC signaling, the UE detects and receives the downlink control channel on each OFDM symbol, and the network side device uses the indication information carried in the multicast channel to adjust the first detection time parameter, as shown in FIG. 6. After receiving the multicast signaling, the UE detects the downlink control channel according to the time frequency of detection and reception of the downlink control channel notified by the multicast signaling, until a next multicast signaling is received, or until a validity period of the multicast signaling ends. Further, the indication signaling for adjusting the detecting and receiving frequency of the downlink control channel may be notified by broadcast signaling, and details are not described herein again.

For instance, the DCI is used as an example. The network side device configures the first detection time parameter for detection and reception of the downlink control channel to the UE by high-layer signaling. For the first detection time parameter, reference may be made to any of the foregoing embodiments. After the network side device configures the first detection time parameter for detection and reception of the downlink control channel to the UE by high-layer signaling, the indication information carried in the DCI of the scheduling UE is used to adjust the detection time parameter for detection and reception of the downlink control channel by the UE. A valid period of the indication information carried in the DCI of the scheduling UE is a slot in which the scheduling UE transmits or a plurality of consecutive slots including the slot in which DCI is transmitted or until the UE receives the next valid scheduling DCI. In a case that the UE has not received the scheduling DCI, or the validity period of the indication information transmitted in the scheduling DCI exceeds, the downlink control channel is detected and received according to the detection time parameter for the downlink control channel configured by the high-layer signaling.

The network side device may adjust the detecting and receiving time frequency of the downlink control channel by the scheduling DCI, the following manner may be adopted.

The DCI includes 1 bit indication information, indicating that in the subsequent N OFDM symbols, the UE detects and receives the downlink control channel according to the slot or according to each OFDM symbol, where N is a positive integer greater than or equal to 1, for example, N=7. Specifically, when a value of the indication bit is 0, it indicates that the UE detects and receives the downlink control channel according to the slot; and when the value of the indication bit is 1, it indicates that the UE detects and receives the downlink control channel according to the OFDM symbol, that is, within the subsequent N OFDM symbols, the downlink control channel is detected and received on each OFDM symbol, as shown by A in FIG. 7.

Optionally, the DCI includes a ceil (log 2(N)) bit to indicate the time frequency of detection and reception of the downlink control channel by the UE, and the time when the updated detection time parameter for the downlink control channel takes effect is the current slot or until a next scheduling DCI is received. For example, the UE may detect and receive the downlink control channel according to three time frequencies, that is, on every OFDM or every two OFDM symbols or every slot, where binary code 00 indicates every OFDM, binary code 01 indicates every two OFDM symbols, and binary code 10 indicates every slot, as shown by B in FIG. 7.

Figure 7:
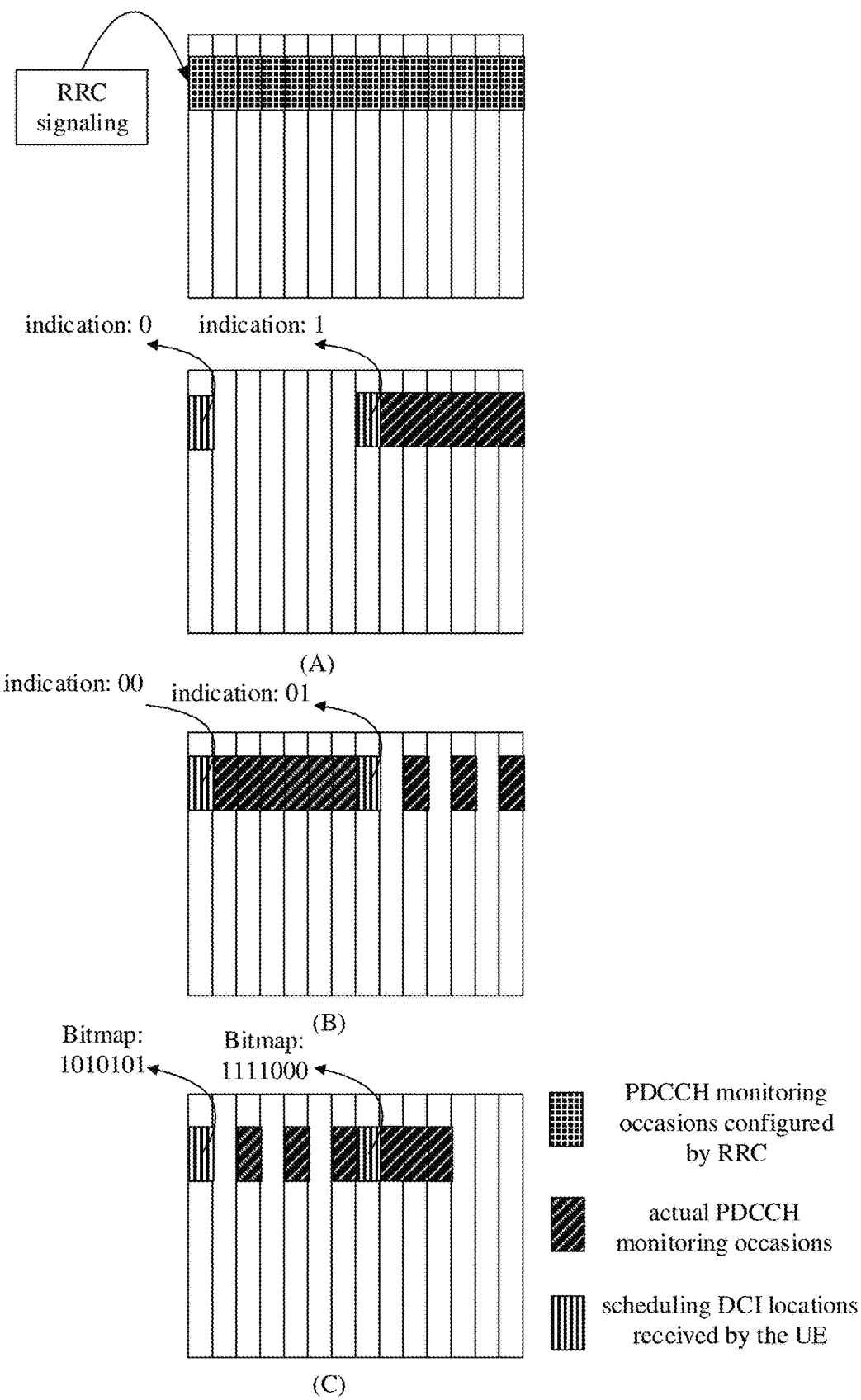
FIG. 7 is a schematic view showing another detection and reception of a downlink control channel according to some embodiments of the present disclosure.

Optionally, the DCI includes a bitmap of M bits to indicate the time domain locations at which the UE needs to detect and receive of the downlink control channel, for example, M=7, where binary code 0 in the bitmap indicates that it is not required to detect and receive the downlink control channel on this OFDM symbol or in the mini-slot (which is composed of one or more OFDM symbols, and is the minimum resource granularity of the time domain resource), and binary code 1 indicates that it is required to detect and receive the downlink control channel on this OFDM symbol or in the mini-slot, as shown by C in FIG. 7.

In this example, it is assumed that the valid period of the indication information carried in the DCI of the scheduling UE is the current slot, as shown in FIG. 7.

It should be noted that several possible embodiments described above in some embodiments of the present disclosure may be implemented in combination with each other, or may be implemented separately, which are not limited in some embodiments of the present disclosure.

In the embodiments of the present disclosure, the UE determines a first detection time parameter indicated by the network side device for detection and reception of the downlink control channel, and the UE selects a corresponding downlink control channel time domain resource according to the first detection time parameter to detect and receive the downlink control channel. In this way, it is able for the UE to perform detection and reception of the downlink control channel only on the corresponding downlink control channel time domain resource, thereby reducing power consumption of the UE.

Figure 8:
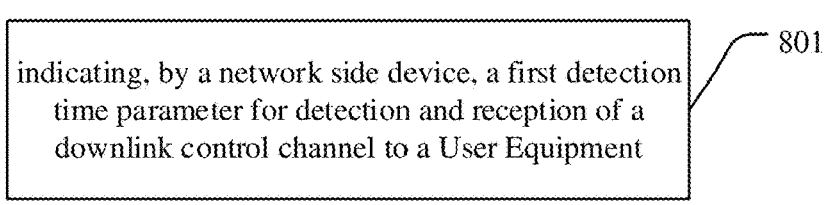
FIG. 8 is a flow chart of another method for detecting and receiving a downlink control channel according to some embodiments of the present disclosure.

Reference is made to FIG. 8, which is a flow chart of another method for detecting and receiving a downlink control channel according to some embodiments of the present disclosure. As shown in FIG. 8, the method includes the step 801.

Step 801: indicating, by a network side device, a first detection time parameter for detection and reception of a downlink control channel to a User Equipment (UE), where the first detection time parameter is used for the UE to select a corresponding downlink control channel time domain resource according to the first detection time parameter to detect and receive the downlink control channel.

Optionally, the first detection time parameter is used to indicate a detecting and receiving frequency of the downlink control channel.

Optionally, the first detection time parameter indicates one of N predetermined detecting and receiving frequencies by using log 2 (N) bits, where N is the quantity of the predetermined detecting and receiving frequencies; or the first detection time parameter indicates the detecting and receiving frequency of the downlink control channel by using 1 bit, where if the 1 bit has a first value, the first detection time parameter indicates the detection and reception to be performed once in each slot for the downlink control channel, and if the 1 bit has a second value, the first detection time parameter indicates the detection and reception to be performed once on each symbol for the downlink control channel.

Optionally, the first detection time parameter indicates, to the UE, a target time domain resource on which the downlink control channel needs to be detected and received, by using a bitmap.

Optionally, the first detection time parameter indicates, to the UE, a target time domain resource set on which the downlink control channel needs to be detected and received, and the target time domain resource set includes at least one time domain resource.

Optionally, the first detection time parameter is a detection time parameter explicitly indicated by the network side device, or the first detection time parameter is a detection time parameter pre-negotiated and determined by the UE and the network side device.

Optionally, the indicating, by the network side device, the first detection time parameter for detection and reception of the downlink control channel to the UE includes: transmitting, by the network side device, the first detection time parameter for detection and reception of the downlink control channel to the UE; or implicitly indicating, by the network side device, the first detection time parameter for detection and reception of the downlink control channel to the UE.

Optionally, the transmitting, by the network side device, the first detection time parameter for detection and reception of the downlink control channel to the UE includes: transmitting, by the network side device, a high-layer signaling to the UE, where the high-layer signaling includes the first detection time parameter for detection and reception of the downlink control channel; or transmitting, by the network side device, a broadcast signaling or a multicast signaling to the UE, where the broadcast signaling or the multicast signaling includes the first detection time parameter for detection and reception of the downlink control channel.

Optionally, the first detection time parameter is valid within a predetermined time period; and/or the first detection time parameter included in the broadcast signaling is valid for all UEs under the network side device; and the first detection time parameter included in the multicast signaling is valid for a group of UEs, where the group of UEs includes one or more UEs.

Optionally, the method further includes: transmitting, by the network side device, a detection time parameter adjustment message to the UE, where the detection time parameter adjustment message is used for the UE to select, from the downlink control channel time domain resource, a corresponding time domain resource for detection and reception of the downlink control channel according to a detection time parameter corresponding to the detection time parameter adjustment message.

Optionally, the detecting time parameter adjustment message is used to indicate the UE to perform detection and reception of the downlink control channel according to a second detection time parameter; or the detection time parameter adjustment message is used to indicate the UE to continue to perform detection and reception of the downlink control channel according to the first detection time parameter.

Optionally, the detecting time parameter adjustment message indicates the UE to perform detection and reception of the downlink control channel according to the second detection time parameter in T downlink control channel time domain resources after receiving the detection time adjustment message, where the T is an integer greater than or equal to 1; or the detection time parameter adjustment message indicates the UE to perform detection and reception of the downlink control channel according to the second detection time parameter in K consecutive time domain resources after receiving the detection time adjustment message, where the K is an integer greater than or equal to 1; or the detection time parameter adjustment message indicates the UE to perform detection and reception of the downlink control channel according to the second detection time parameter until receiving a next detection time parameter adjustment message.

Optionally, the detection time parameter adjustment message includes a broadcast signaling, a multicast signaling, or scheduling of downlink control information.

It should be noted that the embodiments are implementations corresponding to the network side device of the embodiments as shown in FIG. 2, and for a specific implementation thereof, reference may be made to relevant description of the embodiments shown in FIG. 2. No repeated description will be given in the present embodiment, while also achieving the same advantageous effects.

Figure 9:
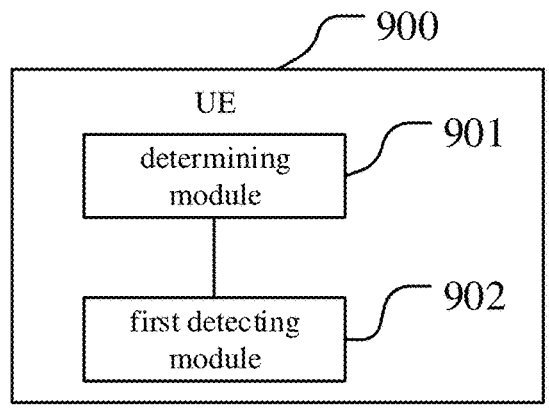
FIG. 9 is a structural diagram of a User Equipment (UE) according to some embodiments of the present disclosure.

Reference is made to FIG. 9, which is a structural diagram of a User Equipment (UE) according to some embodiments of the present disclosure. As shown in FIG. 9, the method includes a determining module 901 and a first detecting module 902.

The determining module 901 is configured to determine a first detection time parameter indicated by a network side device for detection and reception of a downlink control channel, and the first detecting module 902 is configured to select a corresponding downlink control channel time domain resource according to the first detection time parameter to detect and receive the downlink control channel.

Optionally, the first detection time parameter is used to indicate a detecting and receiving frequency of the downlink control channel, and the first detecting module 902 is configured to detect and receive the downlink control channel on the corresponding downlink control channel time domain resource, according to the detecting and receiving frequency indicated by the first detection time parameter.

Optionally, the first detection time parameter indicates one of N predetermined detecting and receiving frequencies by using log 2 (N) bits, where N is the quantity of the predetermined detecting and receiving frequencies; or the first detection time parameter indicates the detecting and receiving frequency of the downlink control channel by using 1 bit, where if the 1 bit has a first value, the first detection time parameter indicates the detection and reception to be performed once in each slot for the downlink control channel, and if the 1 bit has a second value, the first detection time parameter indicates the detection and reception to be performed once on each symbol for the downlink control channel.

Optionally, the first detection time parameter indicates, by using a bitmap, a target time domain resource on which the downlink control channel needs to be detected and received, to the UE; and the first detecting module 902 is configured to select a target time domain resource indicated by the first detection time parameter, and perform detection and reception of the downlink control channel on the target time domain resource.

Optionally, the first detection time parameter indicates, to the UE, a target time domain resource set on which the downlink control channel needs to be detected and received, and the target time domain resource set includes at least one time domain resource.

The first detecting module 902 is configured to select the target time domain resource set indicated by the first detection time parameter, in at least one predefined time domain resource set for the downlink control channel, and perform detection and reception of the downlink control channel on each time domain resource in the target time domain resource set; where each time domain resource set for the downlink control channel includes at least one time domain resource that is probably configured to detect and receive the downlink control channel.

Optionally, the first detection time parameter is a detection time parameter explicitly indicated by the network side device, or the first detection time parameter is a detection time parameter pre-negotiated and determined by the UE and the network side device.

Optionally, the determining module 901 is configured to receive the first detection time parameter transmitted by the network side device for detection and reception of the downlink control channel; or the determining module 901 is configured to determine a first detection time parameter pre-negotiated with the network side device for detection and reception of the downlink control channel.

Optionally, the determining module 901 is configured to receive a high-layer signaling transmitted by the network side device, where the high-layer signaling includes the first detection time parameter for detection and reception of the downlink control channel; or the determining module 901 is configured to receive a broadcast signaling or multicast signaling transmitted by the network side device, where the broadcast signaling or the multicast signaling includes the first detection time parameter for detection and reception of the downlink control channel.

Optionally, the first detection time parameter is valid within a predetermined time period; and/or the first detection time parameter included in the broadcast signaling is valid for all UEs under the network side device; and the first detection time parameter included in the multicast signaling is valid for a group of UEs, where the group of UEs includes one or more UEs.

Figure 10:
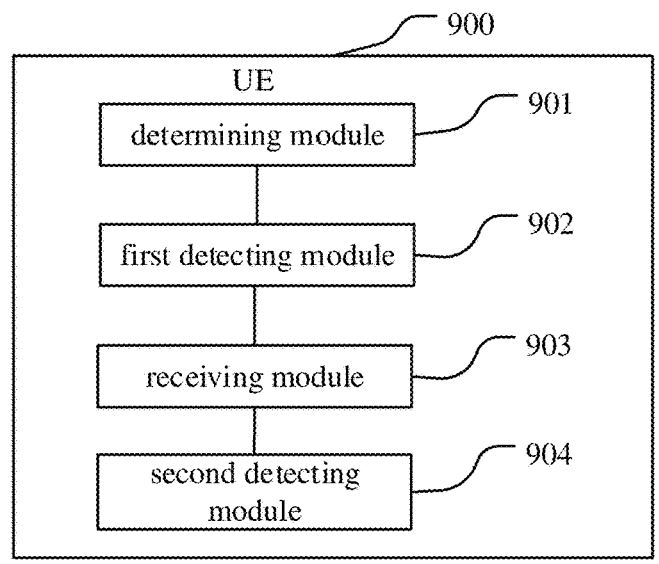
FIG. 10 is a structural diagram of another UE according to some embodiments of the present disclosure.

Optionally, as shown in FIG. 10, the UE 900 further includes: a receiving module 903, configured to receive a detection time parameter adjustment message transmitted by the network side device; and a second detecting module 904, configured to select a corresponding time domain resource for detection and reception of the downlink control channel according to the detection time parameter corresponding to the detection time parameter adjustment message, from the downlink control channel time domain resources.

Optionally, the detecting time parameter adjustment message is used to indicate the UE to perform detection and reception of the downlink control channel according to a second detection time parameter; or the detection time parameter adjustment message is used to indicate the UE to continue to perform detection and reception of the downlink control channel according to the first detection time parameter.

Optionally, the detecting time parameter adjustment message indicates the UE to perform detection and reception of the downlink control channel according to the second detection time parameter in T downlink control channel time domain resources after receiving the detection time adjustment message, where the T is an integer greater than or equal to 1; or the detection time parameter adjustment message indicates the UE to perform detection and reception of the downlink control channel according to the second detection time parameter in K consecutive time domain resources after receiving the detection time adjustment message, where the K is an integer greater than or equal to 1; or the detection time parameter adjustment message indicates the UE to perform detection and reception of the downlink control channel according to the second detection time parameter until receiving a next detection time parameter adjustment message.

Optionally, the detection time parameter adjustment message includes a broadcast signaling, a multicast signaling, or scheduling of downlink control information.

It is noted that the above UE 900 in this embodiment may be the UE in any of the method embodiments of some embodiments of the present disclosure, and any of the method embodiments of some embodiments of the present disclosure may be implemented by the above UE 900 in this embodiment, while also achieving the same advantageous effects, which will not be described repeatedly.

Figure 11:
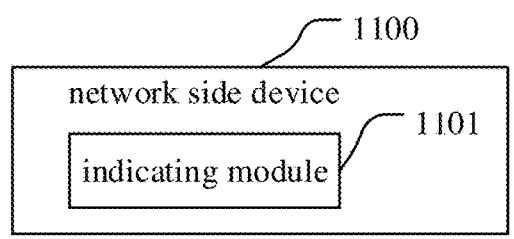
FIG. 11 is a structural diagram of a network side device according to some embodiments of the present disclosure.

Reference is made to FIG. 11, which is a structural diagram of another network side device according to some embodiments of the present disclosure. As shown in FIG. 11, the network side device 1100 includes: an indicating module 1101, configured to indicate a first detection time parameter for detection and reception of a downlink control channel to a User Equipment (UE), where the first detection time parameter is used for the UE to select a corresponding downlink control channel time domain resource according to the first detection time parameter to detect and receive the downlink control channel.

Optionally, the first detection time parameter is used to indicate a detecting and receiving frequency of the downlink control channel.

Optionally, the first detection time parameter indicates one of N predetermined detecting and receiving frequencies by using log 2 (N) bits, where N is the quantity of the predetermined detecting and receiving frequencies; or the first detection time parameter indicates the detecting and receiving frequency of the downlink control channel by using 1 bit, where if the 1 bit has a first value, the first detection time parameter indicates the detection and reception to be performed once in each slot for the downlink control channel, and if the 1 bit has a second value, the first detection time parameter indicates the detection and reception to be performed once on each symbol for the downlink control channel.

Optionally, the first detection time parameter indicates, to the UE, a target time domain resource on which the downlink control channel needs to be detected and received, by using a bitmap.

Optionally, the first detection time parameter indicates, to the UE, a target time domain resource set on which the downlink control channel needs to be detected and received, and the target time domain resource set includes at least one time domain resource.

Optionally, the first detection time parameter is a detection time parameter explicitly indicated by the network side device, or the first detection time parameter is a detection time parameter pre-negotiated and determined by the UE and the network side device.

Optionally, the indicating module 1101 is configured to transmit the first detection time parameter for detection and reception of the downlink control channel to the UE; or the indicating module 1101 is configured to implicitly indicate a first detection time parameter for detection and reception of the downlink control channel to the UE.

Optionally, the indicating module 1101 is configured to transmit a high-layer signaling to the UE, where the high-layer signaling includes the first detection time parameter for detection and reception of the downlink control channel; or the indicating module is configured to transmit a broadcast signaling or a multicast signaling to the UE, where the broadcast signaling or the multicast signaling includes the first detection time parameter for detection and reception of the downlink control channel.

Optionally, the first detection time parameter is valid within a predetermined time period; and/or the first detection time parameter included in the broadcast signaling is valid for all UEs under the network side device; and the first detection time parameter included in the multicast signaling is valid for a group of UEs, where the group of UEs includes one or more UEs.

Figure 12:
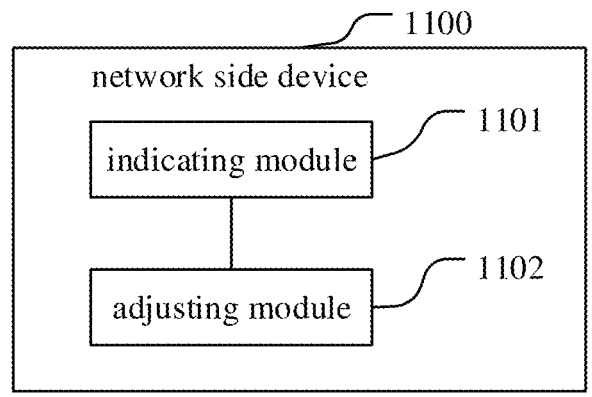
FIG. 12 is a structural diagram of another network side device according to some embodiments of the present disclosure.

Optionally, as shown in FIG. 12, the network side device 1100 further includes: an adjusting module 1102, configured to transmit a detection time parameter adjustment message to the UE, where the detection time parameter adjustment message is used for the UE to select a corresponding time domain resource for detection and reception of the downlink control channel according to the detection time parameter corresponding to the detection time parameter adjustment message, from the downlink control channel time domain resources.

Optionally, the detecting time parameter adjustment message is used to indicate the UE to perform detection and reception of the downlink control channel according to a second detection time parameter; or the detection time parameter adjustment message is used to indicate the UE to continue to perform detection and reception of the downlink control channel according to the first detection time parameter.

Optionally, the detecting time parameter adjustment message indicates the UE to perform detection and reception of the downlink control channel according to the second detection time parameter in T downlink control channel time domain resources after receiving the detection time adjustment message, where the T is an integer greater than or equal to 1; or the detection time parameter adjustment message indicates the UE to perform detection and reception of the downlink control channel according to the second detection time parameter in K consecutive time domain resources after receiving the detection time adjustment message, where the K is an integer greater than or equal to 1; or the detection time parameter adjustment message indicates the UE to perform detection and reception of the downlink control channel according to the second detection time parameter until receiving a next detection time parameter adjustment message.

Optionally, the detection time parameter adjustment message includes a broadcast signaling, a multicast signaling, or scheduling of downlink control information.

It is noted that the above network side device 1100 in this embodiment may be the network side device in any of the method embodiments of some embodiments of the present disclosure, and any of the method embodiments of some embodiments of the present disclosure may be implemented by the above network side device 1100 in this embodiment, while also achieving the same advantageous effects, which will not be described repeatedly.

Figure 13:
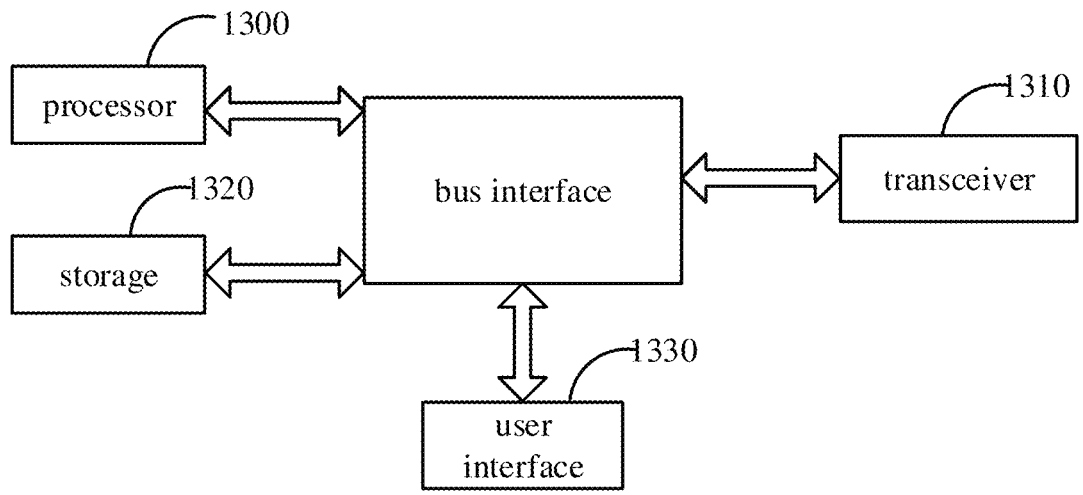
FIG. 13 is a structural diagram of another UE according to some embodiments of the present disclosure.

Reference is made to FIG. 13, which is a structural diagram of a UE according to some embodiments of the present disclosure. As shown in FIG. 13, the UE includes: a processor 1300, a transceiver 1310, a storage 1320, a user interface 1330 and a bus interface, where the processor 1300 is configured to read a program stored in the storage 1320 and perform the following process: determining a first detection time parameter indicated by a network side device for detection and reception of a downlink control channel; and selecting a corresponding downlink control channel time domain resource according to the first detection time parameter to detect and receive the downlink control channel.

The transceiver 1310 is configured to receive and transmit data under the control of the processor 1300.

In FIG. 13, a bus architecture may include any number of interconnected buses and bridges. Specifically, various circuits including one or more processors represented by the processor 1300 and storages represented by the storage 1320 are linked together by the bus architecture. The bus architecture may also link various other circuits together, such as peripherals, voltage regulators, and power management circuits, as is known in the art. Therefore, no further description is given herein. A bus interface provides an interface. The transceiver 1310 may be a plurality of elements, including receivers and transmitters and providing a unit for communicating with various other devices over a transmission medium. For different user devices, the user interface 1330 may also be an interface that is capable of externally or internally connecting with a required device which may include but is not limited to a keypad, a display, a speaker, microphone, and a joystick.

The processor 1300 is responsible for managing the bus architecture and the normal processing. The storage 1320 may be configured to store data used by the processor 1300 in performing operations.

Optionally, the first detection time parameter is used to indicate a detecting and receiving frequency of the downlink control channel.

The selecting the corresponding downlink control channel time domain resource according to the first detection time parameter to detect and receive the downlink control channel includes: detecting and receiving the downlink control channel on the corresponding downlink control channel time domain resource, according to the detecting and receiving frequency indicated by the first detection time parameter.

Optionally, the first detection time parameter indicates one of N predetermined detecting and receiving frequencies by using log 2 (N) bits, where N is the quantity of the predetermined detecting and receiving frequencies; or the first detection time parameter indicates the detecting and receiving frequency of the downlink control channel by using 1 bit, where if the 1 bit has a first value, the first detection time parameter indicates the detection and reception to be performed once in each slot for the downlink control channel, and if the 1 bit has a second value, the first detection time parameter indicates the detection and reception to be performed once on each symbol for the downlink control channel.

Optionally, the first detection time parameter indicates, to the UE, a target time domain resource on which the downlink control channel needs to be detected and received, by using a bitmap. The selecting the corresponding downlink control channel time domain resource according to the first detection time parameter to detect and receive the downlink control channel includes: selecting a target time domain resource indicated by the first detection time parameter, and performing detection and reception of the downlink control channel on the target time domain resource.

Optionally, the first detection time parameter indicates, to the UE, a target time domain resource set on which the downlink control channel needs to be detected and received, and the target time domain resource set includes at least one time domain resource. The selecting the corresponding downlink control channel time domain resource according to the first detection time parameter to detect and receive the downlink control channel includes: selecting the target time domain resource set indicated by the first detection time parameter, in at least one predefined time domain resource set for the downlink control channel, and performing detection and reception of the downlink control channel on each time domain resource in the target time domain resource set; where each time domain resource set for the downlink control channel includes at least one time domain resource that has possibility configured to detect and receive the downlink control channel.

Optionally, the first detection time parameter is a detection time parameter explicitly indicated by the network side device, or the first detection time parameter is a detection time parameter pre-negotiated and determined by the UE and the network side device.

Optionally, the determining, by the UE, the first detection time parameter indicated by the network side device for detection and reception of the downlink control channel includes: receiving, by the transceiver 1310, a first detection time parameter transmitted by the network side device for detection and reception of the downlink control channel; or determining a first detection time parameter pre-negotiated with the network side device for detection and reception of the downlink control channel.

Optionally, the receiving by the transceiver 1310 the first detection time parameter transmitted by the network side device for detection and reception of the downlink control channel includes: receiving, by the transceiver 1310, a high-layer signaling transmitted by the network side device, where the high-layer signaling includes the first detection time parameter for detection and reception of the downlink control channel; or receiving, by the transceiver 1310, a broadcast signaling or multicast signaling transmitted by the network side device, where the broadcast signaling or the multicast signaling includes the first detection time parameter for detection and reception of the downlink control channel.

Optionally, the first detection time parameter is valid within a predetermined time period; and/or the first detection time parameter included in the broadcast signaling is valid for all UEs under the network side device; and the first detection time parameter included in the multicast signaling is valid for a group of UEs, where the group of UEs includes one or more UEs.

Optionally, the processor is further configured to: receiving, by the transceiver 1310, a detection time parameter adjustment message transmitted by the network side device;

and select a corresponding time domain resource for detection and reception of the downlink control channel according to the detection time parameter corresponding to the detection time parameter adjustment message, from the downlink control channel time domain resources.

Optionally, the detecting time parameter adjustment message is used to indicate the UE to perform detection and reception of the downlink control channel according to a second detection time parameter; or the detection time parameter adjustment message is used to indicate the UE to continue to perform detection and reception of the downlink control channel according to the first detection time parameter.

Optionally, the detecting time parameter adjustment message indicates the UE to perform detection and reception of the downlink control channel according to the second detection time parameter in T downlink control channel time domain resources after receiving the detection time adjustment message, where the T is an integer greater than or equal to 1; or the detection time parameter adjustment message indicates the UE to perform detection and reception of the downlink control channel according to the second detection time parameter in K consecutive time domain resources after receiving the detection time adjustment message, where the K is an integer greater than or equal to 1; or the detection time parameter adjustment message indicates the UE to perform detection and reception of the downlink control channel according to the second detection time parameter until receiving a next detection time parameter adjustment message.

Optionally, the detection time parameter adjustment message includes a broadcast signaling, a multicast signaling, or scheduling of downlink control information.

It is noted that the above UE in this embodiment may be the UEs in the embodiments shown in FIGS. 1 to 8, and any of the embodiments of the UEs shown in FIGS. 1 to 8 may be implemented by the UE in this embodiment, while also achieving the same advantageous effects, which will not be described repeatedly.

Figure 14:
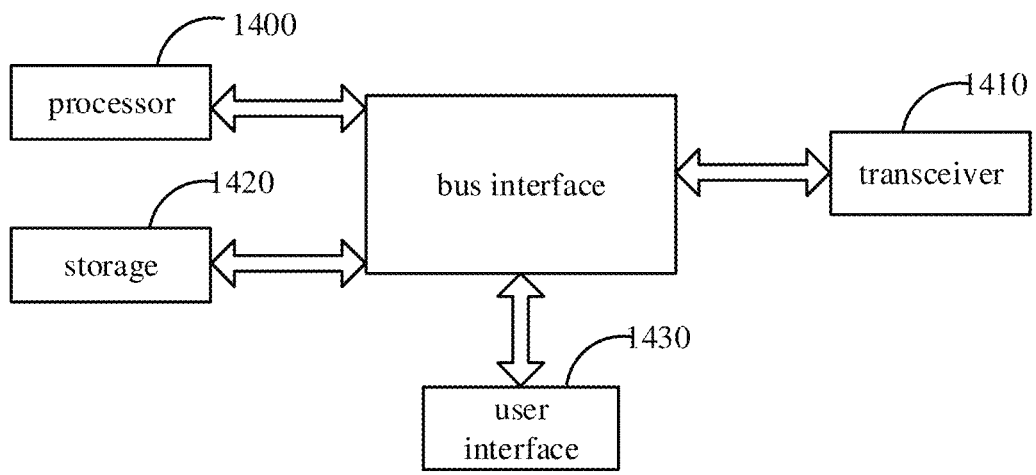
FIG. 14 is a structural diagram of another network side device according to some embodiments of the present disclosure.

Reference is made to FIG. 14, which is a structural diagram of a network side device according to some embodiments of the present disclosure. As shown in FIG. 14, the network side device includes: a processor 1400, a transceiver 1410, a storage 1420, a user interface 1430 and a bus interface, where the processor 1400 is configured to read a program stored in the storage 1420 and perform the following process: indicating a first detection time parameter for detection and reception of a downlink control channel to a User Equipment (UE), where the first detection time parameter is used for the UE to select a corresponding downlink control channel time domain resource according to the first detection time parameter to detect and receive the downlink control channel.

The transceiver 1410 is configured to receive and transmit data under the control of the processor 1400.

In FIG. 14, a bus architecture may include any quantity of interconnected buses and bridges. Specifically, various circuits including one or more processors represented by the processor 1400 and storages represented by the storage 1420 are linked together by the bus architecture. The bus architecture may also link various other circuits together, such as peripherals, voltage regulators, and power management circuits, as is known in the art. Therefore, no further description is given herein. A bus interface provides an interface. The transceiver 1410 may be a plurality of elements, including receivers and transmitters and providing a unit for communicating with various other devices over a transmission medium. For different user devices, the user interface 1430 may also be an interface that is capable of externally or internally connecting with a required device which may include but is not limited to a keypad, a display, a speaker, microphone, and a joystick.

The processor 1400 is responsible for managing the bus architecture and the normal processing. The storage 1420 may be configured to store data used by the processor 1400 in performing operations.

Optionally, the first detection time parameter is used to indicate a detecting and receiving frequency of the downlink control channel.

Optionally, the first detection time parameter indicates one of N predetermined detecting and receiving frequencies by using log 2 (N) bits, where N is the quantity of the predetermined detecting and receiving frequencies; or the first detection time parameter indicates the detecting and receiving frequency of the downlink control channel by using 1 bit, where if the 1 bit has a first value, the first detection time parameter indicates the detection and reception to be performed once in each slot for the downlink control channel, and if the 1 bit has a second value, the first detection time parameter indicates the detection and reception to be performed once on each symbol for the downlink control channel.

Optionally, the first detection time parameter indicates, to the UE, a target time domain resource on which the downlink control channel needs to be detected and received by using a bitmap.

Optionally, the first detection time parameter indicates, to the UE, a target time domain resource set on which the downlink control channel needs to be detected and received, and the target time domain resource set includes at least one time domain resource.

Optionally, the first detection time parameter is a detection time parameter explicitly indicated by the network side device, or the first detection time parameter is a detection time parameter pre-negotiated and determined by the UE and the network side device.

Optionally, the indicating the first detection time parameter for detection and reception of the downlink control channel to the UE includes: transmitting, by the transceiver 1410, a first detection time parameter for detection and reception of the downlink control channel to the UE; or implicitly indicating, by the transceiver 1410, a first detection time parameter for detection and reception of the downlink control channel to the UE.

Optionally, the transmitting by the transceiver 1410 the first detection time parameter for detection and reception of the downlink control channel to the UE includes: transmitting, by the transceiver 1410, a high-layer signaling to the UE, where the high-layer signaling includes the first detection time parameter for detection and reception of the downlink control channel; or transmitting, by the transceiver 1410, a broadcast signaling or multicast signaling to the UE, where the broadcast signaling or the multicast signaling includes the first detection time parameter for detection and reception of the downlink control channel.

Optionally, the first detection time parameter is valid within a predetermined time period; and/or the first detection time parameter included in the broadcast signaling is valid for all UEs under the network side device; and the first detection time parameter included in the multicast signaling is valid for a group of UEs, where the group of UEs includes one or more UEs.

Optionally, the processor 1400 is further configured: transmit, by the transceiver 1410, a detection time parameter adjustment message to the UE, where the detection time parameter adjustment message is used for the UE to select a corresponding time domain resource for detection and reception of the downlink control channel according to the detection time parameter corresponding to the detection time parameter adjustment message, from the downlink control channel time domain resources.

Optionally, the detecting time parameter adjustment message is used to indicate the UE to perform detection and reception of the downlink control channel according to a second detection time parameter; or the detection time parameter adjustment message is used to indicate the UE to continue to perform detection and reception of the downlink control channel according to the first detection time parameter.

Optionally, the detecting time parameter adjustment message indicates the UE to perform detection and reception of the downlink control channel according to the second detection time parameter in T downlink control channel time domain resources after receiving the detection time adjustment message, where the T is an integer greater than or equal to 1; or the detection time parameter adjustment message indicates the UE to perform detection and reception of the downlink control channel according to the second detection time parameter in K consecutive time domain resources after receiving the detection time adjustment message, where the K is an integer greater than or equal to 1; or the detection time parameter adjustment message indicates the UE to perform detection and reception of the downlink control channel according to the second detection time parameter until receiving a next detection time parameter adjustment message.

Optionally, the detection time parameter adjustment message includes a broadcast signaling, a multicast signaling, or scheduling of downlink control information.

It is noted that the above network side device in this embodiment may be the network side devices in the embodiments shown in FIGS. 1 to 8, and any of the embodiments of the network side devices shown in FIGS. 1 to 8 may be implemented by the network side device in this embodiment, while also achieving the same advantageous effects, which will not be described repeatedly.

In the several embodiments according to the present disclosure, it should be understood that the disclosed method and device may be implemented in other manners. For example, the device embodiments described above are merely illustrative. For example, the division of the units is only a division in terms of logical function. In actual implementation, there may also be other division manners; for example, multiple units or components may be combined or integrated into another system, or some features can be omitted or not executed. In addition, the mutual coupling or direct coupling or communication connection as shown or discussed may be an indirect coupling or communication connection through some interfaces, devices or units, and may be in electrical, mechanical or other forms.

In addition, individual functional units in various embodiments of the present disclosure may be integrated into one processing unit, or individual units may be physically included separately, or two or more units may be integrated into one unit. The above integrated unit can be implemented in the form of hardware or in the form of a combination of hardware functional units and software functional units.

The above described integrated unit implemented in the form of software functional unit can be stored in a computer readable storage medium. The above software functional unit is stored in a storage medium and includes a plurality of instructions for enabling a computer device (which may be a personal computer, a server, or a network side device, etc.) to execute part of the steps of the receiving and transmitting methods of the various embodiments of the present disclosure. The foregoing storage medium includes: a U disk, a mobile hard disk, a Read-Only Memory (ROM), a Random Access Memory (RAM), a magnetic disk or an optical disk, and various media capable of storing program codes thereon.

Described above are optional embodiments of the present disclosure. It should be noted that those skilled in the art can also make numerous improvements and modifications without departing from the principles of the present disclosure, and these improvements and modifications shall also fall within the scope of protection of the present disclosure.

What is claimed is:

1. A method for detecting and receiving a downlink control channel, comprising:
   determining, by a User Equipment (UE), a first detection time parameter indicated by a network side device for detection and reception of the downlink control channel; and
   selecting, by the UE, a corresponding downlink control channel time domain resource according to the first detection time parameter to detect and receive the downlink control channel,
   wherein the first detection time parameter is used to indicate a detecting and receiving frequency of the downlink control channel, and
   the selecting, by the UE, the corresponding downlink control channel time domain resource according to the first detection time parameter to detect and receive the downlink control channel comprises: detecting and receiving, by the UE, the downlink control channel on the corresponding downlink control channel time domain resource, according to the detecting and receiving frequency indicated by the first detection time parameter,
   wherein the first detection time parameter indicates one of N predetermined detecting and receiving frequencies by using ceil($\log_2(N)$) bits, N being the quantity of the predetermined detecting and receiving frequencies, wherein each of the detecting and receiving frequencies is used to indicate the UE to detect and receive the downlink control channel once on every M symbols, M being an integer greater than or equal to 1; or
   the first detection time parameter indicates the detecting and receiving frequency of the downlink control channel by using 1 bit, wherein in a case that the 1 bit has a first value, the first detection time parameter indicates the detection and reception to be performed once in each slot for the downlink control channel, and in a case that the 1 bit has a second value, the first detection time parameter indicates the detection and reception to be performed once on each symbol for the downlink control channel.

2. The method according to claim 1, wherein the first detection time parameter indicates, by using a bitmap, a target time domain resource on which the downlink control channel needs to be detected and received, to the UE; and
   the selecting, by the UE, the corresponding downlink control channel time domain resource according to the first detection time parameter to detect and receive the downlink control channel comprises: selecting, by the UE, a target time domain resource indicated by the first detection time parameter, and performing detection and reception of the downlink control channel on the target time domain resource.

3. The method according to claim 1, wherein the first detection time parameter indicates, to the UE, a target time domain resource set on which the downlink control channel needs to be detected and received, and the target time domain resource set comprises at least one time domain resource; and
- the selecting, by the UE, the corresponding downlink control channel time domain resource according to the first detection time parameter to detect and receive the downlink control channel comprises: selecting, by the UE, the target time domain resource set indicated by the first detection time parameter, from at least one predefined time domain resource set for the downlink control channel, and performing detection and reception of the downlink control channel on each of the at least one time domain resource in the target time domain resource set, and
- wherein each of the at least one predefined time domain resource set for the downlink control channel comprises at least one time domain resource that is potential for performing detection and reception of the downlink control channel, and
- wherein the first detection time parameter is a detection time parameter explicitly indicated by the network side device, or the first detection time parameter is a detection time parameter determined by pre-negotiation between the UE and the network side device.

4. The method according to claim 1, wherein the determining, by the UE, the first detection time parameter indicated by the network side device for detection and reception of the downlink control channel comprises:
- receiving, by the UE, the first detection time parameter transmitted by the network side device for detection and reception of the downlink control channel; or
- determining, by the UE, the first detection time parameter pre-negotiated between the UE and the network side device for detection and reception of the downlink control channel.

5. The method according to claim 4, wherein the receiving, by the UE, the first detection time parameter transmitted by the network side device for detection and reception of the downlink control channel comprises:
- receiving, by the UE, a high-layer signaling transmitted by the network side device, wherein the high-layer signaling comprises the first detection time parameter for detection and reception of the downlink control channel; or
- receiving, by the UE, a broadcast signaling or a multicast signaling transmitted by the network side device, wherein the broadcast signaling or the multicast signaling comprises the first detection time parameter for detection and reception of the downlink control channel.

6. The method according to claim 1, further comprising:
- receiving, by the UE, a detection time parameter adjustment message transmitted by the network side device; and
- selecting, by the UE, a corresponding time domain resource for detection and reception of the downlink control channel, from downlink control channel time domain resources, according to a detection time parameter corresponding to the detection time parameter adjustment message, wherein the detection time parameter adjustment message comprises a broadcast signaling, a multicast signaling, or scheduling of downlink control information.

7. The method according to claim 6, wherein the detecting time parameter adjustment message is used to indicate the UE to perform detection and reception of the downlink control channel according to a second detection time parameter; or
- the detection time parameter adjustment message is used to indicate the UE to continue to perform detection and reception of the downlink control channel according to the first detection time parameter, and
- wherein the detecting time parameter adjustment message is used to indicate to perform detection and reception of the downlink control channel according to the second detection time parameter in T downlink control channel time domain resources after receiving the detection time adjustment message, wherein the T is an integer greater than or equal to 1; or
- the detection time parameter adjustment message is used to indicate the UE to perform detection and reception of the downlink control channel according to the second detection time parameter in K consecutive time domain resources after receiving the detection time adjustment message, wherein the K is an integer greater than or equal to 1; or
- the detection time parameter adjustment message is used to indicate the UE to perform detection and reception of the downlink control channel according to the second detection time parameter until receiving a next detection time parameter adjustment message.

8. A method for detecting and receiving a downlink control channel, comprising:
- indicating, by a network side device, a first detection time parameter for detection and reception of the downlink control channel to a User Equipment (UE), wherein the first detection time parameter is used for the UE to select a corresponding downlink control channel time domain resource according to the first detection time parameter to detect and receive the downlink control channel,
- wherein the first detection time parameter is used to indicate a detecting and receiving frequency of the downlink control channel,
- wherein the first detection time parameter indicates one of N predetermined detecting and receiving frequencies by using ceil($\log_2$(N)) bits, N being the quantity of the predetermined detecting and receiving frequencies, wherein each of the detecting and receiving frequencies is used to indicate the UE to detect and receive the downlink control channel once on every M symbols, M being an integer greater than or equal to 1; or
- the first detection time parameter indicates the detecting and receiving frequency of the downlink control channel by using 1 bit, wherein in a case that the 1 bit has a first value, the first detection time parameter indicates the detection and reception to be performed once in each slot for the downlink control channel, and in a case that the 1 bit has a second value, the first detection time parameter indicates the detection and reception to be performed once on each symbol for the downlink control channel.

9. The method according to claim 8, wherein the first detection time parameter indicates, by using a bitmap, a target time domain resource on which the downlink control channel needs to be detected and received, to the UE.

10. The method according to claim 8, wherein the first detection time parameter indicates, to the UE, a target time domain resource set on which the downlink control channel needs to be detected and received, and the target time domain resource set comprises at least one time domain resource, and
    wherein the first detection time parameter is a detection time parameter explicitly indicated by the network side device, or the first detection time parameter is a detection time parameter determined by pre-negotiation between the UE and the network side device.

11. The method according to claim 8, wherein the indicating, by the network side device, the first detection time parameter for detection and reception of the downlink control channel to the UE comprises:
    transmitting, by the network side device, the first detection time parameter for detection and reception of the downlink control channel to the UE; or
    implicitly indicating, by the network side device, the first detection time parameter for detection and reception of the downlink control channel to the UE.

12. The method according to claim 11, wherein the transmitting, by the network side device, the first detection time parameter for detection and reception of the downlink control channel to the UE comprises:
    transmitting, by the network side device, a high-layer signaling to the UE, wherein the high-layer signaling comprises the first detection time parameter for detection and reception of the downlink control channel; or
    transmitting, by the network side device, a broadcast signaling or a multicast signaling to the UE, wherein the broadcast signaling or the multicast signaling comprises the first detection time parameter for detection and reception of the downlink control channel.

13. The method according to claim 8, further comprising:
    transmitting, by the network side device, a detection time parameter adjustment message to the UE, wherein the detection time parameter adjustment message is used for the UE to select, from the downlink control channel time domain resource, a corresponding time domain resource for detection and reception of the downlink control channel according to a detection time parameter corresponding to the detection time parameter adjustment message,
    wherein the detection time parameter adjustment message comprises a broadcast signaling, a multicast signaling, or scheduling of downlink control information.

14. The method according to claim 13, wherein the detecting time parameter adjustment message is used to indicate the UE to perform detection and reception of the downlink control channel according to a second detection time parameter; or
    the detection time parameter adjustment message is used to indicate the UE to continue to perform detection and reception of the downlink control channel according to the first detection time parameter, and
    wherein the detecting time parameter adjustment message is used to indicate the UE to perform detection and reception of the downlink control channel according to the second detection time parameter in T downlink control channel time domain resources after receiving the detection time adjustment message, wherein the T is an integer greater than or equal to 1; or
    the detection time parameter adjustment message is used to indicate the UE to perform detection and reception of the downlink control channel according to the second detection time parameter in K consecutive time domain resources after receiving the detection time adjustment message, wherein the K is an integer greater than or equal to 1; or
    the detection time parameter adjustment message is used to indicate the UE to perform detection and reception of the downlink control channel according to the second detection time parameter until receiving a next detection time parameter adjustment message.

15. A User Equipment, comprising:
    a processor and a storage, wherein the storage is configured to store a program executable by the processor, and data, and the processor is configured, when reading the program in the storage, to:
    determine a first detection time parameter indicated by a network side device for detection and reception of the downlink control channel; and
    select a corresponding downlink control channel time domain resource according to the first detection time parameter to detect and receive the downlink control channel,
    wherein the first detection time parameter is used to indicate a detecting and receiving frequency of the downlink control channel, and
    the processor is further configured to: detect and receive the downlink control channel on the corresponding downlink control channel time domain resource, according to the detecting and receiving frequency indicated by the first detection time parameter,
    wherein the first detection time parameter indicates one of N predetermined detecting and receiving frequencies by using ceil($\log_2(N)$) bits, N being the quantity of the predetermined detecting and receiving frequencies, wherein each of the detecting and receiving frequencies is used to indicate the UE to detect and receive the downlink control channel once on every M symbols, M being an integer greater than or equal to 1; or
    the first detection time parameter indicates the detecting and receiving frequency of the downlink control channel by using 1 bit, wherein in a case that the 1 bit has a first value, the first detection time parameter indicates the detection and reception to be performed once in each slot for the downlink control channel, and in a case that the 1 bit has a second value, the first detection time parameter indicates the detection and reception to be performed once on each symbol for the downlink control channel.

16. The User Equipment according to claim 15, wherein the first detection time parameter indicates, by using a bitmap, a target time domain resource on which the downlink control channel needs to be detected and received, to the UE; and
    the processor is further configured to select a target time domain resource indicated by the first detection time parameter, and performing detection and reception of the downlink control channel on the target time domain resource.

17. The User Equipment according to claim 15, wherein the first detection time parameter indicates, to the UE, a target time domain resource set on which the downlink control channel needs to be detected and received, and the target time domain resource set comprises at least one time domain resource; and
    the processor is further configured to select the target time domain resource set indicated by the first detection time parameter, from at least one predefined time domain resource set for the downlink control channel, and performing detection and reception of the downlink control channel on each of the at least one time domain resource in the target time domain resource set, and wherein each of the at least one predefined time domain resource set for the downlink control channel comprises at least one time domain resource that is potential for performing detection and reception of the downlink control channel, and wherein the first detection time parameter is a detection time parameter explicitly indicated by the network side device, or the first detection time parameter is a detection time parameter determined by pre-negotiation between the UE and the network side device.

18. The User Equipment according to claim 15, wherein the processor is further configured to:

receive the first detection time parameter transmitted by the network side device for detection and reception of the downlink control channel; or determine the first detection time parameter pre-negotiated between the UE and the network side device for detection and reception of the downlink control channel.

19. The User Equipment according to claim 18, wherein the processor is further configured to:

receive a high-layer signaling transmitted by the network side device, wherein the high-layer signaling comprises the first detection time parameter for detection and reception of the downlink control channel; or receive a broadcast signaling or a multicast signaling transmitted by the network side device, wherein the broadcast signaling or the multicast signaling comprises the first detection time parameter for detection and reception of the downlink control channel.

20. A network side device, configured to perform the method according to claim 8, comprising:

a processor and a storage, wherein the storage is configured to store a program executable by the processor, and data, and the processor is configured to read the program in the storage to perform following steps:

indicating a first detection time parameter for detection and reception of the downlink control channel to a User Equipment (UE), wherein the first detection time parameter is used for the UE to select a corresponding downlink control channel time domain resource according to the first detection time parameter to detect and receive the downlink control channel, wherein the first detection time parameter is used to indicate a detecting and receiving frequency of the downlink control channel, wherein the first detection time parameter indicates one of N predetermined detecting and receiving frequencies by using $\text{ceil}(\log_2(N))$ bits, N being the quantity of the predetermined detecting and receiving frequencies; or the first detection time parameter indicates the detecting and receiving frequency of the downlink control channel by using 1 bit, wherein in a case that the 1 bit has a first value, the first detection time parameter indicates the detection and reception to be performed once in each slot for the downlink control channel, and in a case that the 1 bit has a second value, the first detection time parameter indicates the detection and reception to be performed once on each symbol for the downlink control channel.

* * * * *